(12) United States Patent
Woodward, IV et al.

(10) Patent No.: US 10,156,771 B2
(45) Date of Patent: Dec. 18, 2018

(54) OPTICAL PARAMETRIC OSCILLATOR

(71) Applicant: THE UNITED STATES OF AMERICA, AS REPRESENTED BY THE SECRETARY OF COMMERCE, Washington, DC (US)

(72) Inventors: John T. Woodward, IV, Bethesda, MD (US); Steven W. Brown, Gaithersburg, MD (US); Keith R. Lykke, Gaithersburg, MD (US)

(73) Assignee: THE UNITED STATES OF AMERICA, AS REPRESENTED BY THE SECRETARY OF COMMERCE, Washington, DC (US)

(*) Notice: Subject to any disclaimer, the term of this patent is extended or adjusted under 35 U.S.C. 154(b) by 0 days.

(21) Appl. No.: 15/358,470

(22) Filed: Nov. 22, 2016

(65) Prior Publication Data
US 2017/0155227 A1 Jun. 1, 2017

Related U.S. Application Data

(60) Provisional application No. 62/261,689, filed on Dec. 1, 2015.

(51) Int. Cl.
*G02F 1/39* (2006.01)
(52) U.S. Cl.
CPC .................... *G02F 1/39* (2013.01)

(58) Field of Classification Search
CPC .......... G02F 1/39; H01S 3/105; H01S 3/1083; H01S 3/109
See application file for complete search history.

(56) References Cited

U.S. PATENT DOCUMENTS

| | | | | |
|---|---|---|---|---|
| 3,743,383 A * | 7/1973 | Giallorenzi | ........ | G02B 27/1006 359/640 |
| 6,147,793 A * | 11/2000 | Alford | ...... | G02F 1/39 359/330 |
| 6,647,033 B1 * | 11/2003 | Smith | ....... | G02F 1/39 372/100 |
| 6,963,443 B2 * | 11/2005 | Pfeiffer | ..... | G02F 1/39 359/330 |
| 7,869,471 B1 * | 1/2011 | Yin | ........... | G02F 1/39 372/100 |
| 8,498,043 B2 * | 7/2013 | Esteban-Martin | ........ | G02F 1/39 359/330 |
| 9,356,413 B2 * | 5/2016 | Kubo | ..... | H01S 3/0057 |
| 2010/0060976 A1 * | 3/2010 | Ebrahim-Zadeh | .... | G02F 1/3532 359/328 |
| 2017/0093115 A1 * | 3/2017 | McCorkel | ......... | H01S 3/1083 |

* cited by examiner

*Primary Examiner* — Daniel Petkovsek
(74) *Attorney, Agent, or Firm* — Office of Chief Counsel for National Institute of Standards and Technology

(57) ABSTRACT

An optical parametric oscillator produces optical parametric light and includes a frequency splitter to produce signal light and idler light; a wavelength selector to select a wavelength of the signal light and to produce optical parametric light from the selected wavelength of the signal light; and an optical frequency doubler to double an optical frequency of the optical parametric light.

12 Claims, 17 Drawing Sheets

OPTICAL PARAMETRIC OSCILLATOR

CROSS REFERENCE TO RELATED APPLICATIONS

This application claims the benefit of U.S. Provisional Patent Application Ser. No. 62/261,689, filed Dec. 1, 2015, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is an optical parametric oscillator to produce optical parametric light, the optical parametric oscillator comprising: a wavelength selector to receive a signal light and to produce the optical parametric light, the wavelength selector comprising: a first prism to receive the signal light and to produce first dispersed light; a second prism in optical communication with the first prism to receive the first dispersed light from the first prism and to produce second dispersed light, the second dispersed light comprising a plurality of dispersed wavelengths; and a first reflector in optical communication with the second prism: to receive the second dispersed light from the second prism; and to reflect the second dispersed light at a selected mirror angle, the mirror angle to control a resonance wavelength of the optical parametric oscillator, wherein the second dispersed light reflected from the first reflector is communicated to the second prism, refracted by the second prism based on the selected mirror angle and communicated to the first prism from the second prism, received by the first prism and refracted by the first prism based on the selected mirror angle such that the first prism produces the optical parametric light comprising the resonance wavelength that is communicated from the first prism at a cavity angle that couples the optical parametric light into a cavity of the optical parametric oscillator, and the optical parametric light comprises the resonance wavelength that circulates in the cavity of the optical parametric oscillator.

Also discloses is an optical parametric oscillator to produce optical parametric light, the optical parametric oscillator comprising: a frequency splitter to receive a pump light and to produce a splitter light from the pump light, the splitter light comprising: a signal light comprising a signal frequency; and an idler light comprising an idler frequency; and a path length selector to adjust a path length of the optical parametric oscillator and comprising a wavelength selector that is in optical communication with the frequency splitter to receive the signal light and to produce the optical parametric light, the wavelength selector comprising: a first prism to receive the signal light and to produce first dispersed light; a second prism in optical communication with the first prism to receive the first dispersed light from the first prism and to produce second dispersed light, the second dispersed light comprising a plurality of dispersed wavelengths; and a first reflector in optical communication with the second prism: to receive the second dispersed light from the second prism; and to reflect the second dispersed light at a selected mirror angle, the mirror angle to control a resonance wavelength of the optical parametric oscillator, wherein the second dispersed light reflected from the first reflector is communicated to the second prism, refracted by the second prism based on the selected mirror angle and communicated to the first prism from the second prism, received by the first prism and refracted by the first prism based on the selected mirror angle such that the first prism produces the optical parametric light comprising the resonance wavelength that is communicated from the first prism at a cavity angle that couples the optical parametric light into a cavity of the optical parametric oscillator, the optical parametric light comprising the resonance wavelength that circulates in the optical parametric oscillator, wherein the path length compensator adjusts the path length of the optical parametric oscillator to match a temporal coherence path length of the optical parametric light in the optical parametric oscillator.

Further disclosed is an optical parametric oscillator to produce optical parametric light, the optical parametric oscillator comprising: a frequency splitter to receive a pump light and to produce a splitter light from the pump light, the splitter light comprising: a signal light comprising a signal frequency; and an idler light comprising an idler frequency; a wavelength selector in optical communication with the frequency splitter to receive the signal light and to produce the optical parametric light, the wavelength selector comprising: a first prism to receive the signal light and to produce first dispersed light; a second prism in optical communication with the first prism to receive the first dispersed light from the first prism and to produce second dispersed light, the second dispersed light comprising a plurality of dispersed wavelengths; and a first reflector in optical communication with the second prism: to receive the second dispersed light from the second prism; and to reflect the second dispersed light at a selected mirror angle, the mirror angle to control a resonance wavelength of the optical parametric oscillator, wherein the second dispersed light reflected from the first reflector is communicated to the second prism, refracted by the second prism based on the selected mirror angle and communicated to the first prism from the second prism, received by the first prism and refracted by the first prism based on the selected mirror angle such that the first prism produces the optical parametric light comprising the resonance wavelength that is communicated from the first prism at a cavity angle that couples the optical parametric light into a cavity of the optical parametric oscillator, the optical parametric light comprising the resonance wavelength that circulates in the optical parametric oscillator; and a path length compensator in optical communication with the wavelength selector to receive the optical parametric light from the wavelength selector and to adjust a path length of the optical parametric oscillator to match a temporal coherence path length of the optical parametric light in the optical parametric oscillator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that an optical parametric oscillator herein provides output light that is high power, narrow linewidth, quasi-continuous wave, and continuously tunable in a broad wavelength range from ultraviolet wavelengths to infrared wavelengths. Advantageously, the optical parametric oscillator is automated, solid state, and fits on a transportable table top. Beneficially, the optical parametric oscillator provides spectral responsivity calibration of optical devices such as large aperture optical devices, e.g., earth-observing satellite sensors. Further, the optical parametric oscillator replaces a suite of lasers used to span the spectral range of such devices.

Figure 1:
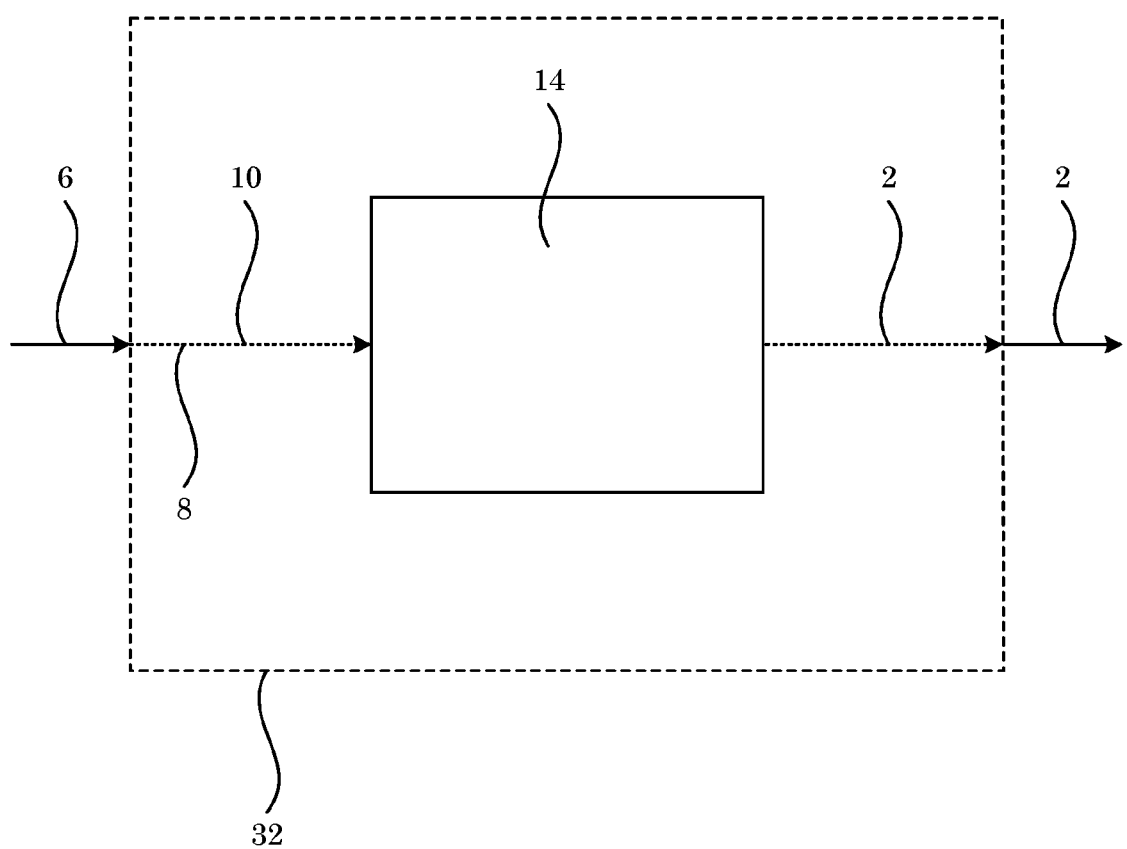
FIG. 1 shows an optical parametric oscillator.

In an embodiment, with reference to FIG. 1, optical parametric oscillator 100 includes wavelength selector 14 disposed in cavity 32. Here, pump light 6 is communicated to cavity 32 in which signal light 10 is produced. Signal light 10 includes splitter light 8 that is received by wavelength selector 14. Wavelength selector 14 receives signal light 10 and produces optical parametric light 2, wherein wavelength selector 14 selects a wavelength from signal light 10 to produce optical parametric light 2. In this manner, a wavelength range of signal light 10 is selectively filtered by wavelength selector 14 such that optical parametric light 2 includes a wavelength that is within the wavelength range of signal light 10. Optical parametric light 2 produced by wavelength selector 14 circulates in cavity 32 of optical parametric oscillator 100 and a portion of optical parametric light 2 is communicated out of cavity 32.

Figure 2:
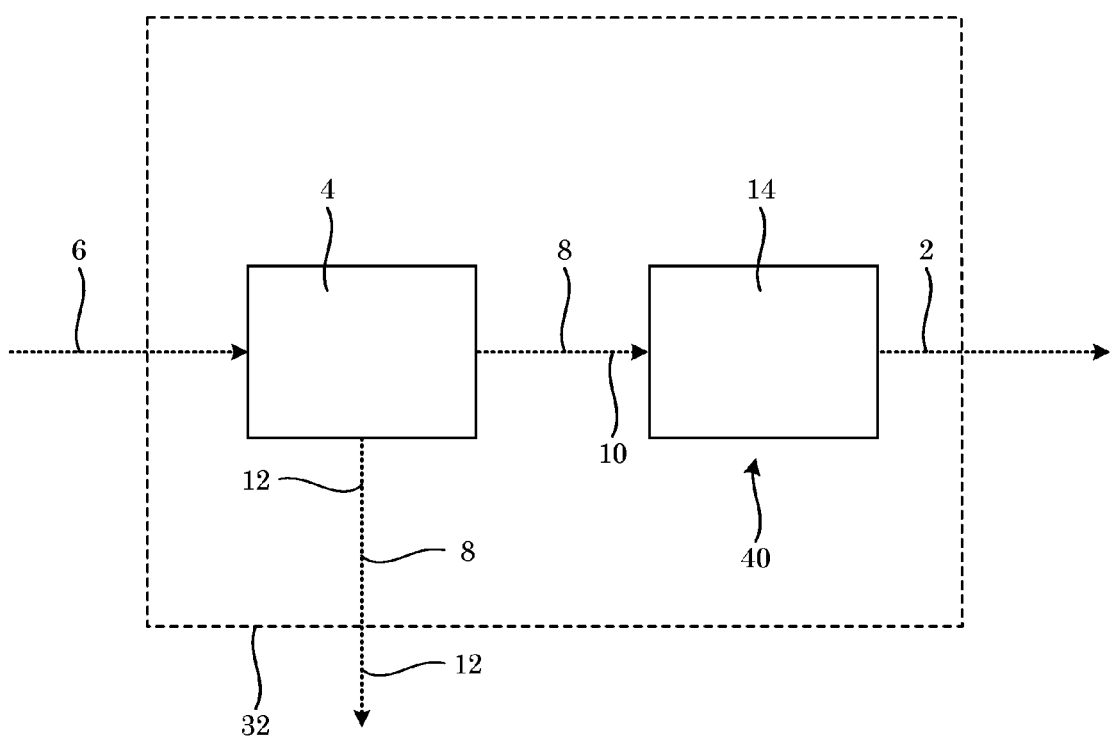
FIG. 2 shows an optical parametric oscillator.

In an embodiment, with reference to FIG. 2, optical parametric oscillator 100 includes frequency splitter 4 that receives pump light 6 and produces splitter light 8 from pump light 6. Splitter light 8 includes signal light 10 that includes signal frequency 50 (see, e.g., FIG. 9) and idler light 12 that includes idler frequency 52 (see, e.g., FIG. 9). Optical parametric oscillator 100 also includes path length selector 40 that is in optical communication with frequency splitter 4 and adjusts a path length of the optical parametric oscillator 100. Path length selector 40 includes wavelength selector 14 in optical communication with frequency splitter 4. Wavelength selector 14 receives signal light 10 from frequency splitter 4 and produces optical parametric light 2. Here, wavelength selector 14 of path length selector 40 and frequency splitter 4 are disposed in cavity 32 of optical parametric oscillator 100, wherein pump light 6 is communicated to cavity 32 and received by frequency splitter 4. Frequency splitter 4 produces splitter light 8 that includes signal light 10 and idler light 12. Idler light 12 is communicated from frequency splitter 4 to outside of cavity 32. Additionally, signal light 10 is communicated from frequency splitter 4 to wavelength selector 14 of path length selector 40. Signal light 10 is received by wavelength selector 14 and produces optical parametric light 2 from signal light 10. Here, wavelength selector 14 selects a wavelength from signal light 10 to produce optical parametric light 2. In this manner, a wavelength range of signal light 10 is selectively filtered by wavelength selector 14 such that optical parametric light 2 includes a wavelength that is within the wavelength range of signal light 10. Optical parametric light 2 produced by wavelength selector 14 circulates in cavity 32 of optical parametric oscillator 100 and a portion of optical parametric light 2 is communicated out of cavity 32.

It is contemplated that path length selector 40 adjusts a path length of the optical parametric oscillator 100 by changing a position of wavelength selector 14 inside of cavity 32 such that wavelength selector 14 matches a temporal coherence path length of optical parametric light 2 in optical parametric oscillator 100. That is, wavelength selector 14 can be positioned in cavity 32 to lengthen or shorten a path length traversed by optical parametric light 2 in optical parametric oscillator 100. Such path length depends on a wavelength of optical parametric light 2 produced by wavelength selector 14.

Figure 3:
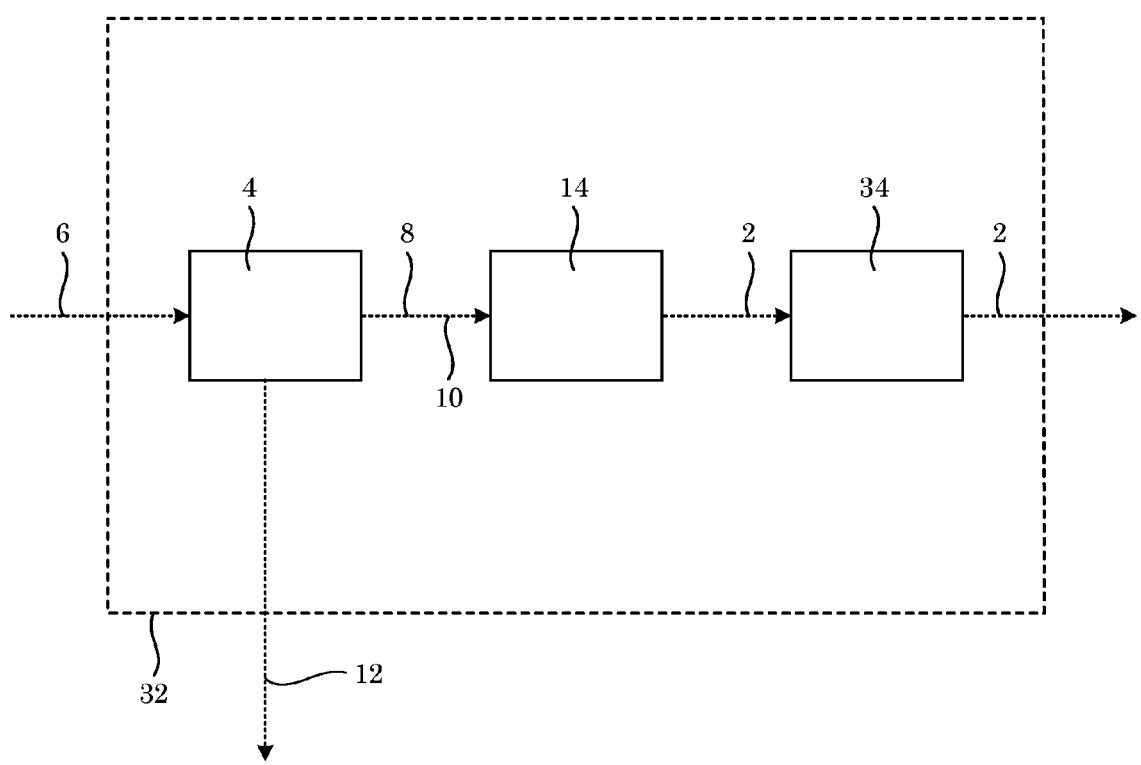
FIG. 3 shows an optical parametric oscillator.

In an embodiment, with reference to FIG. 3, optical parametric oscillator 100 includes frequency splitter 4 that receives pump light 6 and produces splitter light 8 from pump light 6. Splitter light 8 includes signal light 10 that includes signal frequency 50 (see, e.g., FIG. 9) and idler light 12 that includes idler frequency 52 (see, e.g., FIG. 9). Optical parametric oscillator 100 also includes wavelength selector 14 in optical communication with frequency splitter 4. Wavelength selector 14 receives signal light 10 from frequency splitter 4 and produces optical parametric light 2. Optical parametric oscillator 100 also includes path length compensator 34 that is in optical communication with wavelength selector 14 and adjusts a path length of the optical parametric oscillator 100. Path length compensator 34 receives optical parametric light 2 from wavelength selector 14.

Here, wavelength selector 14, path length compensator 34, and frequency splitter 4 are disposed in cavity 32 of optical parametric oscillator 100, wherein pump light 6 is communicated to cavity 32 and received by frequency splitter 4. Frequency splitter 4 produces splitter light 8 that includes signal light 10 and idler light 12. Idler light 12 is communicated from frequency splitter 4 to outside of cavity 32. Additionally, signal light 10 is communicated from frequency splitter 4 to wavelength selector 14, and signal light 10 is received by wavelength selector 14. Wavelength selector 14 produces optical parametric light 2 from signal light 10. Here, wavelength selector 14 selects a wavelength from signal light 10 to produce optical parametric light 2. In this manner, a wavelength range of signal light 10 is selectively filtered by wavelength selector 14 such that optical parametric light 2 includes a wavelength that is within the wavelength range of signal light 10. Optical parametric light 2 produced by wavelength selector 14 circulates in cavity 32 of optical parametric oscillator 100 and a portion of optical parametric light 2 is communicated out of cavity 32 after communication through path length compensator 34. It is contemplated that path length compensator 34 adjusts a path length of the optical parametric oscillator 100 by changing a position of an optic (e.g., a mirror such as mirror 110 shown in FIG. 4) inside of cavity 32 such that path length compensator 34 matches a temporal coherence path length of optical parametric light 2 in optical parametric oscillator 100. That is, an optic of path length compensator 34 can be positioned in cavity 32 to lengthen or shorten a path length traversed by optical parametric light 2 in optical parametric oscillator 100. Such path length depends on a wavelength of optical parametric light 2 produced by wavelength selector 14.

Figure 4:
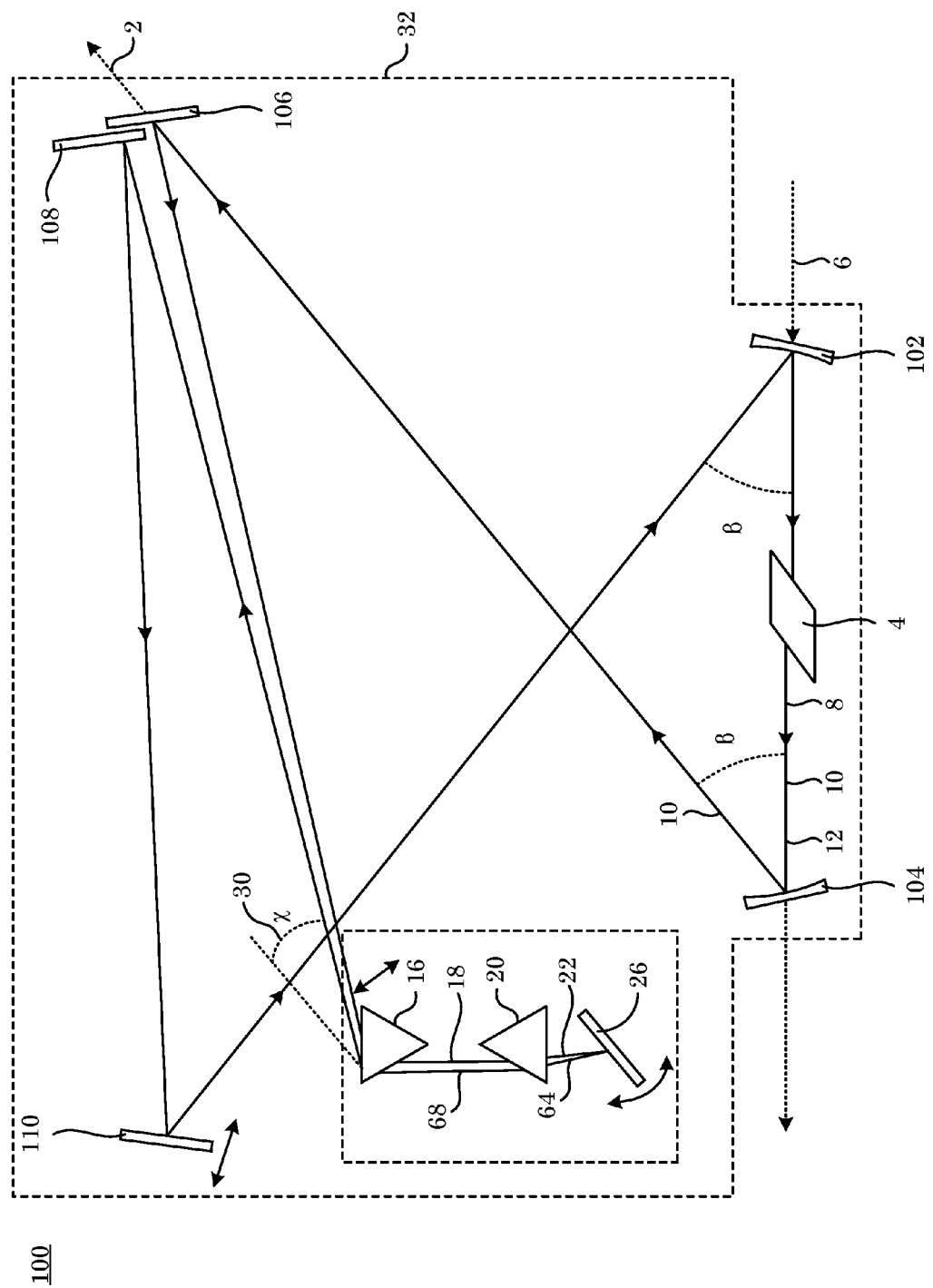
FIG. 4 shows an optical parametric oscillator.

In an embodiment, with reference to FIG. 4, optical parametric oscillator 100 includes cavity 32 in which frequency splitter 4 is interposed between concave reflectors (102, 104) to receive pump light 6 and to produce splitter light 8 from pump light 6. Splitter light 8 includes signal light 10 that includes signal frequency 50 (see, e.g., FIG. 9) and idler light 12 that includes idler frequency 52 (see, e.g., FIG. 9). Idler light 12 is communicated from frequency splitter 4 to concave reflector 104, transmitted through concave reflector 104, and communicated outside of cavity 32. Signal light 10 is communicated from frequency splitter 4, received by concave reflector 104, and reflected by concave reflector 104. From concave reflector 104, signal light 10 is communicated to mirror 106, reflected by mirror 106, and communicated to wavelength selector 14.

Figure 7:
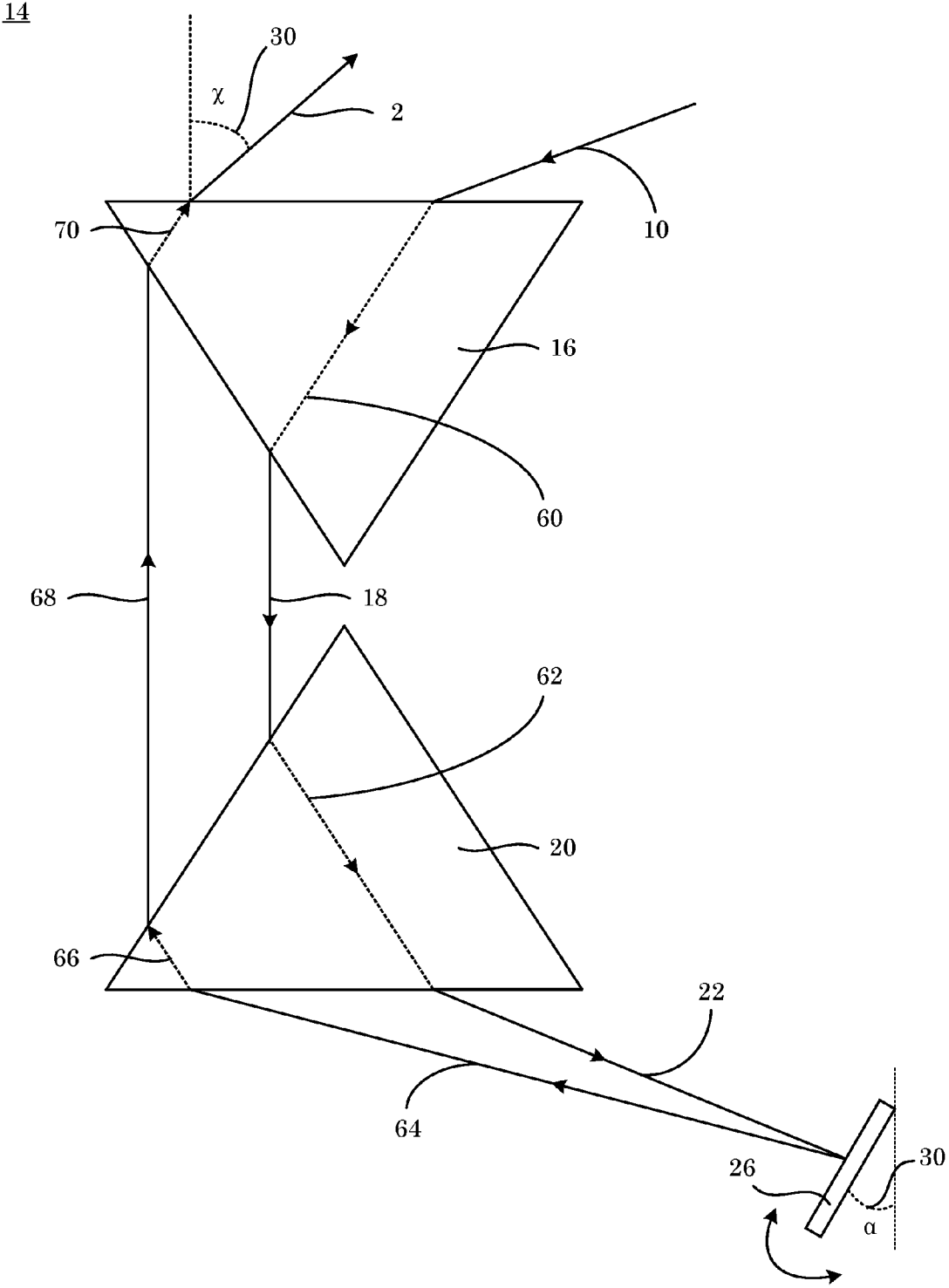
FIG. 7 shows a wavelength selector.

Here, wavelength selector 14 is in optical communication with frequency splitter 4 via mirror 106 and concave reflector 104 such that wavelength selector 14 receives signal light 10 from mirror 106 and produces parametric light 2 from signal light 10. Wavelength selector 14 includes first prism 16 that receives signal light 10 and produces first dispersed light 18 by refracting in dispersing signal light 10. Wavelength selector 14 also includes second prism 20 in optical communication with first prism 16 that receives first dispersed light 18 from first prism 16 and produces second dispersed light 22 by refracting and dispersing first dispersed light 18. First dispersed light 18 and second dispersed light 22 include a plurality of dispersed wavelengths. First reflector 26 is in optical communication with second prism 20 and receives second dispersed light 22 from second prism 20. First reflector 26 reflects second dispersed light 22 as light 64 at selected mirror angle 28 (see, e.g., FIG. 7, FIG. 8, and FIG. 11), wherein mirror angle 28 controls a resonance wavelength of optical parametric oscillator 100. Here, first reflector 26 has rotary motion as shown by the curved arrow in FIG. 4, and mirror angle 28 is selected by rotating first reflector 26.

Second dispersed light 22 is reflected from first reflector 26 as light 64 that is communicated to second prism 20. Light 64 is refracted and dispersed by second prism 20 based on selected mirror angle 28 and communicated to first prism 16 as light 68 from second prism 20. Light 68 is received by first prism 16 and refracted and dispersed by first prism 16 based on selected mirror angle 28 such that first prism 16 produces optical parametric light 2 including the resonance wavelength that is communicated from first prism 16 at cavity angle 30 that couples optical parametric light 2 into cavity 32 of optical parametric oscillator 100. Optical parametric light 2 includes the resonance wavelength and circulates in cavity 32 of optical parametric oscillator 100. Here, it should be appreciated that due to a combination of refraction (by prisms 16, 20), dispersion (by prisms 16, 20), and reflection (at mirror angle 28 from first reflector 26) of signal light 10 received by wavelength selector 14, wavelength selector 14 filters the range of wavelengths of signal light 10 into a narrower range of wavelengths that wavelength selector 14 produces as optical parametric light 2. Due to selection of mirror angle 28, a particular wavelength of optical parametric light 2 is selected by wavelength selector 14.

Optical parametric light 2 is communicated from first prism 16 of wavelength selector 14 to mirror 108, reflected by mirror 108, communicated from mirror 108 to mirror 110, reflected by mirror 110, and communicated from mirror 110 to concave reflector 102. The path length of optical parametric oscillator 100 is subjected to adjustment to match a temporal coherence path length of optical parametric light 2 produced by wavelength selector 14 in optical parametric oscillator 100. Here, adjustment of the path length of cavity 32 of optical parametric oscillator 100 can be accomplished by the path length selector or the path length compensator. According to an embodiment, with respect to FIG. 4, adjustment of the path length of cavity 32 is accomplished by the path length selector that includes wavelength selector 14, wherein first reflector 26 of wavelength selector 14 is positioned to shorten or to lengthen the path length of cavity 32 by moving first reflector 26. According to an embodiment, with respect to FIG. 4, adjustment of the path length of cavity 32 is accomplished by the path length compensator that includes an optic in cavity 32 external to wavelength selector 14 such as mirror 110, wherein mirror 110 is selectively positioned to shorten or to lengthen the path length of cavity 32 by moving mirror 110 in cavity 32. In some embodiments, adjustment of the path length at cavity 32 is accomplished by selectively positioning first reflector 26, mirror 110, or a combination of first reflector 26 and mirror 110. It should be appreciated that first prism 16 and second prism 20 refract light while cavity angle 30 is determined by a relative position and angles with respect to one another at least of first prism 16, mirror 106, and mirror 108.

Concave reflector 102 receives optical parametric light 2 from reflector 110 (and also can simultaneously receive pump light 6), wherein optical parametric light 2 and pump light 6 are communicated from concave reflector 102 to recirculate optical parametric light 2 through cavity 32 and to produce an additional amount of optical parametric light 2 from signal light 10 of splitter light 8 produced by frequency splitter 4 from pump light 6. Optical parametric light 2 and signal light 10 are received by mirror 106. Mirror 106 reflects signal light 10 and a portion of optical parametric light 2 for communication to wavelength selector 14. Mirror 106 also transmits a portion of optical parametric light 2 out of cavity 32. A reflectivity or transmissivity of mirror 106 to optical parametric light 2 can be selected for a desired transmission of optical parametric light 2 out of cavity 32 by mirror 106. In this manner, mirror 106 provides recirculation of optical parametric light 2 as well as transmission of a selected portion of optical parametric light 2 out of cavity 32. Accordingly, optical parametric oscillator 100 provides idler light 12 from concave reflector 104, optical parametric light 2 from mirror 106, and pump light 6 such that idler light 12, optical parametric light 2, and pump light 6 are available external to cavity 32 of optical parametric oscillator 100.

As used herein, "path length" refers to a total distance through which optical parametric light 2 propagates in cavity 32.

As used herein, "temporal coherence path length" refers to a temporal repetition rate of optical parametric light 2 at which optical parametric light 2 coincides with a pulse of pump light 6 at a concave surface of concave reflector 102 such that optical parametric light 2 temporally overlaps with pump light 6 at concave reflector 102 and frequency splitter 4.

As used herein, "resonance wavelength" refers to a wavelength of light (e.g., optical parametric light 2) that has the temporal coherence path length in cavity 32 such that the light circulates in cavity 32.

Figure 5:
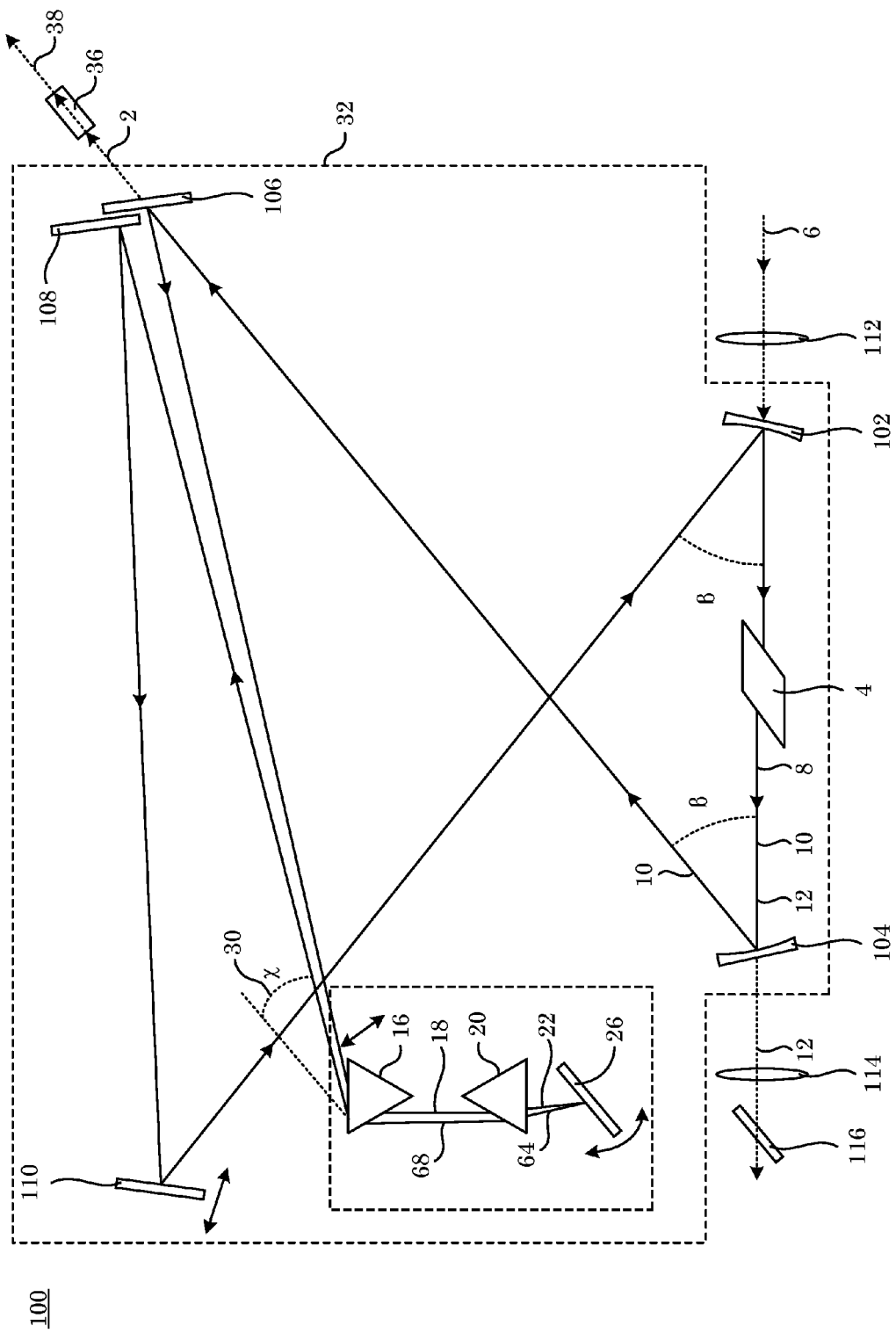
FIG. 5 shows an optical parametric oscillator.

In an embodiment, with reference to FIG. 5, optical parametric oscillator 100 includes cavity 32 in which frequency splitter 4 is interposed between concave reflectors (102, 104) to receive pump light 6 and to produce splitter light 8 from pump light 6. Splitter light 8 includes signal light 10 that includes signal frequency 50 (see, e.g., FIG. 9) and idler light 12 that includes idler frequency 52 (see, e.g., FIG. 9). Idler light 12 is communicated from frequency splitter 4 to concave reflector 104, transmitted through concave reflector 104, and communicated outside of cavity 32. Additional optics or light modification devices can be disposed external to cavity 32. Such optics can include a lens, filter, light modulator, and the like. Here, lens 112 can be disposed external to cavity 32 to receive pump light 6 prior to receipt of pump light 6 by concave reflector 102. Lens 112 can have a selected focal length to focus pump light 6 into frequency splitter 4. Additionally, idler light 12 can be communicated out of cavity 32 and collimated with lens 114 that is disposed proximate to concave reflector 104. Idler light 12 can be optically separated from signal light 10, pump light 6, or optical parametric light 2 by optic 116 (e.g., containing silicon (Si)) arranged at Brewster's angle with respect to propagation of idler light 12 from cavity 32. In an embodiment, signal light 10 and idler light 12 are polarized orthogonal to pump light 6, wherein signal light 10 and pump light 6 are blocked optically by optic 116, wherein idler light 12 is transmitted substantially through optic 116 with a small amount of attenuation.

Signal light 10 is communicated from frequency splitter 4, received by concave reflector 104, and reflected by concave reflector 104. From concave reflector 104, signal light 10 is communicated to mirror 106, reflected by mirror 106, and communicated to wavelength selector 14. Here, wavelength selector 14 is in optical communication with frequency splitter 4 via mirror 106 and concave reflector 104 such that wavelength selector 14 receives signal light 10 from mirror 106 and produces parametric light 2 from signal light 10. Wavelength selector 14 includes first prism 16 that receives signal light 10 and produces first dispersed light 18 by refracting in dispersing signal light 10. Wavelength selector 14 also includes second prism 20 in optical communication with first prism 16 that receives first dispersed light 18 from first prism 16 and produces second dispersed light 22 by refracting and dispersing first dispersed light 18. First dispersed light 18 and second dispersed light 22 include a plurality of dispersed wavelengths. First reflector 26 is in optical communication with second prism 20 and receives second dispersed light 22 from second prism 20. First reflector 26 reflects second dispersed light 22 as light 64 at selected mirror angle 28 (see, e.g., FIG. 7, FIG. 8, and FIG. 11), wherein mirror angle 28 controls a resonance wavelength of optical parametric oscillator 100. Here, first reflector 26 has rotary motion as shown by the curved arrow in FIG. 5, and mirror angle 28 is selected by rotating first reflector 26.

Second dispersed light 22 is reflected from first reflector 26 as light 64 that is communicated to second prism 20. Light 64 is refracted and dispersed by second prism 20 based on selected mirror angle 28 and communicated to first prism 16 as light 68 from second prism 20. Light 68 is received by first prism 16 and refracted and dispersed by first prism 16 based on selected mirror angle 28 such that first prism 16 produces optical parametric light 2 including the resonance wavelength that is communicated from first prism 16 at cavity angle 30 that couples optical parametric light 2 into cavity 32 of optical parametric oscillator 100. Optical parametric light 2 includes the resonance wavelength and circulates in cavity 32 of optical parametric oscillator 100. Here, it should be appreciated that due to a combination of refraction (by prisms 16, 20), dispersion (by prisms 16, 20), and reflection (at mirror angle 28 from first reflector 26) of signal light 10 received by wavelength selector 14, wavelength selector 14 filters the range of wavelengths of signal light 10 into a narrower range of wavelengths that wavelength selector 14 produces as optical parametric light 2. Due to selection of mirror angle 28, a particular wavelength of optical parametric light 2 is selected by wavelength selector 14.

Optical parametric light 2 is communicated from first prism 16 of wavelength selector 14 to mirror 108, reflected by mirror 108, communicated from mirror 108 to mirror 110, reflected by mirror 110, and communicated from mirror 110 to concave reflector 102. The path length of optical parametric oscillator 100 is subjected to adjustment to match a temporal coherence path length of optical parametric light 2 produced by wavelength selector 14 in optical parametric oscillator 100. Here, adjustment of the path length of cavity 32 of optical parametric oscillator 100 can be accomplished by the path length selector or the path length compensator. According to an embodiment, with respect to FIG. 5, adjustment of the path length of cavity 32 is accomplished by the path length selector that includes wavelength selector 14, wherein first reflector 26 of wavelength selector 14 is positioned to shorten or to lengthen the path length of cavity 32 by moving first reflector 26. According to an embodiment, with respect to FIG. 5, adjustment of the path length of cavity 32 is accomplished by the path length compensator that includes an optic in cavity 32 external to wavelength selector 14 such as mirror 110, wherein mirror 110 is selectively positioned to shorten or to lengthen the path length of cavity 32 by moving mirror 110 in cavity 32. In some embodiments, adjustment of the path length at cavity 32 is accomplished by selectively positioning first reflector 26, mirror 110, or a combination of first reflector 26 and mirror 110. It should be appreciated that first prism 16 and second prism 20 refract light while cavity angle 30 is determined by a relative position and angles with respect to one another at least of first prism 16, mirror 106, and mirror 108.

Concave reflector 102 receives optical parametric light 2 from reflector 110 (and also can simultaneously receive pump light 6), wherein optical parametric light 2 and pump light 6 are communicated from concave reflector 102 to recirculate optical parametric light 2 through cavity 32 and to produce an additional amount of optical parametric light 2 from signal light 10 of splitter light 8 produced by frequency splitter 4 from pump light 6. Optical parametric light 2 and signal light 10 are received by mirror 106. Mirror 106 reflects signal light 10 and a portion of optical parametric light 2 for communication to wavelength selector 14. Mirror 106 also transmits a portion of optical parametric light 2 out of cavity 32. A reflectivity or transmissivity of mirror 106 to optical parametric light 2 can be selected for a desired transmission of optical parametric light 2 out of cavity 32 by mirror 106. In this manner, mirror 106 provides recirculation of optical parametric light 2 as well as transmission of a selected portion of optical parametric light 2 out of cavity 32. Optical parametric light 2 transmitted through mirror 106 is received by optical frequency doubler 36, and optical frequency doubler 36 doubles an optical frequency of optical parametric light 2 to produce doubled light 38, wherein doubled light 38 has twice the optical frequency of optical parametric light 2. In this arrangement, optical parametric oscillator 100 includes optical frequency doubler 36 as an extra-cavity doubler. An optical beam splitter can be interposed between mirror 106 and optical frequency doubler 26 to reflect a portion of optical parametric light 2 and to transmit a portion of optical parametric light 2 to optical frequency doubler 36. Accordingly, optical parametric oscillator 100 provides idler light 12 from concave reflector 104, optical parametric light 2 from mirror 106, doubled light 38 from optical frequency doubler 36, and pump light 6 such that idler light 12, optical parametric light 2, doubled light 38, and pump light 6 are available external to cavity 32 of optical parametric oscillator 100.

Figure 6:
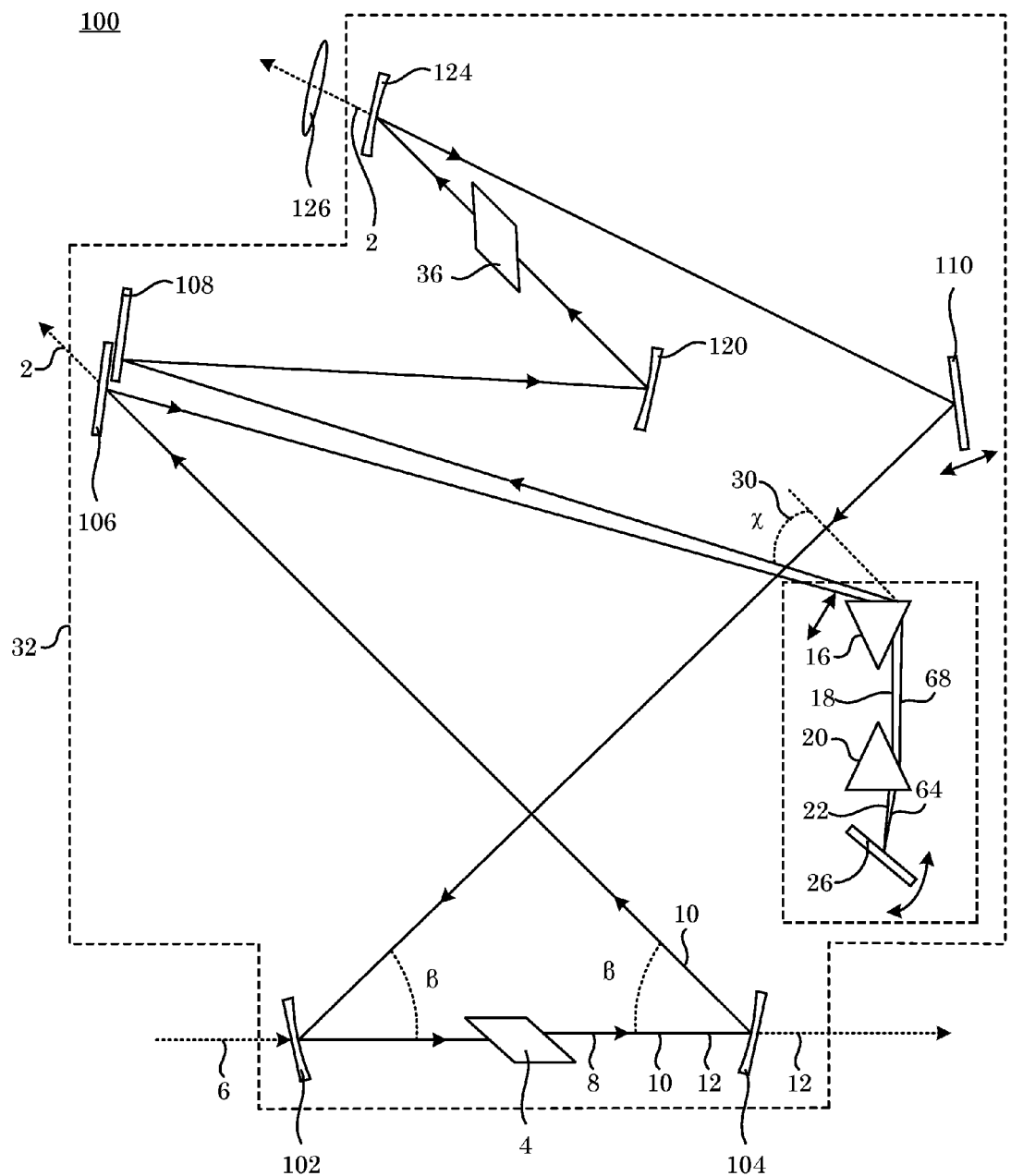
FIG. 6 shows an optical parametric oscillator.

In an embodiment, with reference to FIG. 6, optical parametric oscillator 100 includes optical frequency doubler 36 disposed in cavity 32 and to produce doubled light 38 from optical parametric light 2. Here, frequency splitter 4 is interposed between concave reflectors (102, 104) to receive pump light 6 and to produce splitter light 8 from pump light 6. Splitter light 8 includes signal light 10 that includes signal frequency 50 (see, e.g., FIG. 9) and idler light 12 that includes idler frequency 52 (see, e.g., FIG. 9). Idler light 12 is communicated from frequency splitter 4 to concave reflector 104, transmitted through concave reflector 104, and communicated outside of cavity 32. Additional optics or light modification devices can be disposed external to cavity 32. Such optics can include a lens, filter, light modulator, and the like.

Signal light 10 is communicated from frequency splitter 4, received by concave reflector 104, and reflected by concave reflector 104. From concave reflector 104, signal light 10 is communicated to mirror 106, reflected by mirror 106, and communicated to wavelength selector 14. Here, wavelength selector 14 is in optical communication with frequency splitter 4 via mirror 106 and concave reflector 104 such that wavelength selector 14 receives signal light 10 from mirror 106 and produces parametric light 2 from signal light 10. Wavelength selector 14 includes first prism 16 that receives signal light 10 and produces first dispersed light 18 by refracting in dispersing signal light 10. Wavelength selector 14 also includes second prism 20 in optical communication with first prism 16 that receives first dispersed light 18 from first prism 16 and produces second dispersed light 22 by refracting and dispersing first dispersed light 18. First dispersed light 18 and second dispersed light 22 include a plurality of dispersed wavelengths. First reflector 26 is in optical communication with second prism 20 and receives second dispersed light 22 from second prism 20. First reflector 26 reflects second dispersed light 22 as light 64 at selected mirror angle 28 (see, e.g., FIG. 7, FIG. 8, and FIG. 11), wherein mirror angle 28 controls a resonance wavelength of optical parametric oscillator 100. Here, first reflector 26 has rotary motion as shown by the curved arrow in FIG. 6, and mirror angle 28 is selected by rotating first reflector 26.

Second dispersed light 22 is reflected from first reflector 26 as light 64 that is communicated to second prism 20. Light 64 is refracted in dispersed by second prism 20 based on selected mirror angle 28 and communicated to first prism 16 as light 68 from second prism 20. Light 68 is received by first prism 16 and refracted in dispersed by first prism 16 based on selected mirror angle 28 such that first prism 16 produces optical parametric light 2 including the resonance wavelength that is communicated from first prism 16 at cavity angle 30 that couples optical parametric light 2 into cavity 32 of optical parametric oscillator 100. Optical parametric light 2 includes the resonance wavelength and circulates in cavity 32 of optical parametric oscillator 100. Here, it should be appreciated that due to a combination of refraction (by prisms 16, 20), dispersion (by prisms 16, 20), and reflection (at mirror angle 28 from first reflector 26) of signal light 10 received by wavelength selector 14, wavelength selector 14 filters the range of wavelengths of signal light 10 into a narrower range of wavelengths that wavelength selector 14 produces as optical parametric light 2. Due to selection of mirror angle 28, a particular wavelength of optical parametric light 2 is selected by wavelength selector 14.

Optical parametric light 2 is communicated from first prism 16 of wavelength selector 14 to mirror 108, reflected by mirror 108, communicated from mirror 108 to concave reflector 120, reflected by concave reflector 120, and communicated from concave reflector 120 to optical frequency doubler 36. Optical frequency doubler 36 doubles an optical frequency of optical parametric light 2 to produce doubled light 38, wherein doubled light 38 has twice the optical frequency of optical parametric light 2. In this arrangement, optical frequency doubler 36 is an intra-cavity doubler of optical parametric oscillator 100. It is contemplated that optical frequency doubler 36 may not be 100% efficient at doubling the frequency of optical parametric light 2 to produce doubled light 38. Accordingly, doubled light 38 and optical parametric light 2 are communicated from optical frequency doubler 36 to concave reflector 124.

Concave reflector 124 receives doubled light 38 and optical parametric light 2, reflects optical parametric light 2 to mirror 110, and communicates doubled light 38 out of cavity 32, wherein doubled light 38 can be used externally to cavity 32 of optical parametric oscillator 100. Optical parametric light 2 communicated from mirror 108 to mirror 110 is reflected by mirror 110 and communicated from mirror 110 to concave reflector 102.

The path length of optical parametric oscillator 100 is subjected to adjustment to match a temporal coherence path length of optical parametric light 2 produced by wavelength selector 14 in optical parametric oscillator 100. Here, adjustment of the path length of cavity 32 of optical parametric oscillator 100 can be accomplished by the path length selector or the path length compensator. According to an embodiment, with respect to FIG. 6, adjustment of the path length of cavity 32 is accomplished by the path length selector that includes wavelength selector 14, wherein first reflector 26 of wavelength selector 14 is positioned to shorten or to lengthen the path length of cavity 32 by moving first reflector 26. According to an embodiment, with respect to FIG. 6, adjustment of the path length of cavity 32 is accomplished by the path length compensator that includes an optic in cavity 32 external to wavelength selector 14 such as mirror 110, wherein mirror 110 is selectively positioned to shorten or to lengthen the path length of cavity 32 by moving mirror 110 in cavity 32. In some embodiments, adjustment of the path length at cavity 32 is accomplished by selectively positioning first reflector 26, mirror 110, or a combination of first reflector 26 and mirror 110. It should be appreciated that first prism 16 and second prism 20 refract light while cavity angle 30 is determined by a relative position and angles with respect to one another at least of first prism 16, mirror 106, and mirror 108.

Concave reflector 102 receives optical parametric light 2 from reflector 110 (and also can simultaneously receive pump light 6), wherein optical parametric light 2 and pump light 6 are communicated from concave reflector 102 to recirculate optical parametric light 2 through cavity 32 and to produce an additional amount of optical parametric light 2 from signal light 10 of splitter light 8 produced by frequency splitter 4 from pump light 6. Optical parametric light 2 and signal light 10 are received by mirror 106. Mirror 106 reflects signal light 10 and a portion of optical parametric light 2 for communication to wavelength selector 14. Mirror 106 also transmits a portion of optical parametric light 2 out of cavity 32. A reflectivity or transmissivity of mirror 106 to optical parametric light 2 can be selected for a desired transmission of optical parametric light 2 out of cavity 32 by mirror 106. In this manner, mirror 106 provides recirculation of optical parametric light 2 as well as transmission of a selected portion of optical parametric light 2 out of cavity 32. Optical parametric light 2 transmitted through mirror 106 is received by optical frequency doubler 36, and optical frequency doubler 36 doubles an optical frequency of optical parametric light 2 to produce doubled light 38, wherein doubled light 38 has twice the optical frequency of optical parametric light 2. In this arrangement, optical parametric oscillator 100 includes optical frequency doubler 36 as an extra-cavity doubler. An optical beam splitter can be interposed between mirror 106 and optical frequency doubler 26 to reflect a portion of optical parametric light 2 and to transmit a portion of optical parametric light 2 to optical frequency doubler 36. Accordingly, optical parametric oscillator 100 provides idler light 12 from concave reflector 104, optical parametric light 2 from mirror 106, doubled light 38 from optical frequency doubler 36, and pump light 6 such that idler light 12, optical parametric light 2, doubled light 38, and pump light 6 are available external to cavity 32 of optical parametric oscillator 100.

Optical parametric oscillator 100 can include a pump laser to provide pump light 6 to drive cavity 32. According to an embodiment, the pump laser provides pump light 6 that has a pulse duration (i.e., on-time) from 1 picosecond (ps) to 100 ps, specifically from 5 ps to 50 ps, and more specifically from 10 ps to 20 ps. A wavelength of pump light 6 can be from 350 nm to 2500 nm, specifically from 485 nm to 1100 nm, and more specifically from 510 nm to 535 nm.

A repetition rate of pump light 6 can be from 50 MHz to less than continuous wave, specifically from 70 MHz to 150 MHz, and more specifically from 79 MHz to 81 MHz. A transverse electromagnetic mode (TEM) distribution of pump light 6 can be a $TEM_{00}$ distribution, e.g., at 532 nm. Pump light 6 can have a polarization such as linear polarization. An optical member can control a power, wavelength, polarization, and the like of pump light 6. A half wave plate/polarizer combination can set a polarization of pump light 6 and control the power of pump light 6 into frequency splitter 4.

Optical parametric oscillator 100 includes frequency splitter 4. Here, frequency splitter 4 receives pump light 6 to produce splitter light 8 that includes idler light 12 and signal light 10. In an embodiment, frequency splitter 4 is a crystal, e.g., a nonlinear optical crystal. Exemplary frequency splitters 4 include lithium triborate ($LiB_3O_5$, LBO), barium borate ($Ba(BO_2)_2$, BBO), potassium titanyl phosphate ($KTiOPO_4$, KTP), and the like.

In an embodiment, where frequency splitter 4 is a crystal, the pump light 6 is horizontally polarized and frequency splitter 4 is disposed such that a face of frequency splitter 4 is oriented at Brewster's angle. The pump light 6 is then switched to a vertical polarization to achieve oscillation of the cavity 32. In this embodiment the signal light 10 and idler light 12 will both have horizontal polarization. Some reflection, e.g., 10% reflection, may occur at each face of frequency splitter 4, and a beam blocker can be provided to capture pump light 6 that is reflected by frequency splitter 4. Moreover, pump light 6 can be focused into frequency splitter 4 by a lens (e.g., lens 112).

Frequency splitter 4 is interposed between concave reflectors (102, 104) to collimate pump light 6 and circulate optical parametric light 2 in cavity 32. Concave reflectors (102, 104) are selected to reflect optical parametric light 2 and to transmit pump light 6 and idler light 12.

A wavelength of signal light 10 can be from 400 nm to 2500 nm, specifically from 600 nm to 1150 nm, and more specifically from 680 nm to 1065 nm. An average power of signal light 10 can be from 1 milliWatt (mW) to 10 W, and more specifically from 1 mW to 5 W.

A wavelength of idler light 12 can be from 600 nm to 5000 nm, specifically from 600 nm to 2500 nm, and more specifically from 1064 nm to 2300 nm. An average power of idler light 12 can be from 1 milliWatts (mW) to 5 W, and more specifically from 1 mW to 2 W.

Optical parametric oscillator 100 includes wavelength selector 14 to select a wavelength for optical parametric light 2 from signal light 10. In an embodiment, with reference to FIG. 7, FIG. 8, and FIG. 11, wavelength selector 14 receives signal light 10 at a first surface of first prism 16. Signal light 10 includes a plurality of wavelengths, and first prism 16 refracts signal light 10 as refracted light 60 to disperse spatially the wavelengths included in signal light 10 to produce first dispersed light 18. First dispersed light 18 has spatially dispersed wavelengths that are received by a first surface of second prism 20. Second prism 20 refracts first dispersed light 18 as refracted light 62 further to disperse spatially the wavelengths included in signal light 10 to produce second dispersed light 22 that includes spatially dispersed wavelengths. First reflector 26 receives second dispersed light 22 and reflects second dispersed light 22 as light 64. An angle of reflection of the plurality of dispersed wavelength of second dispersed light 22 is determined by mirror angle 28 in relation to the angles of incidence of second dispersed light 22 on first reflector 26. The angles of incidence of second dispersed light 22 on first reflector 26 depend upon the amount of dispersion of signal light 10 produced by the combination of refraction dispersion by first prism 16 and second prism 20.

Figure 8:
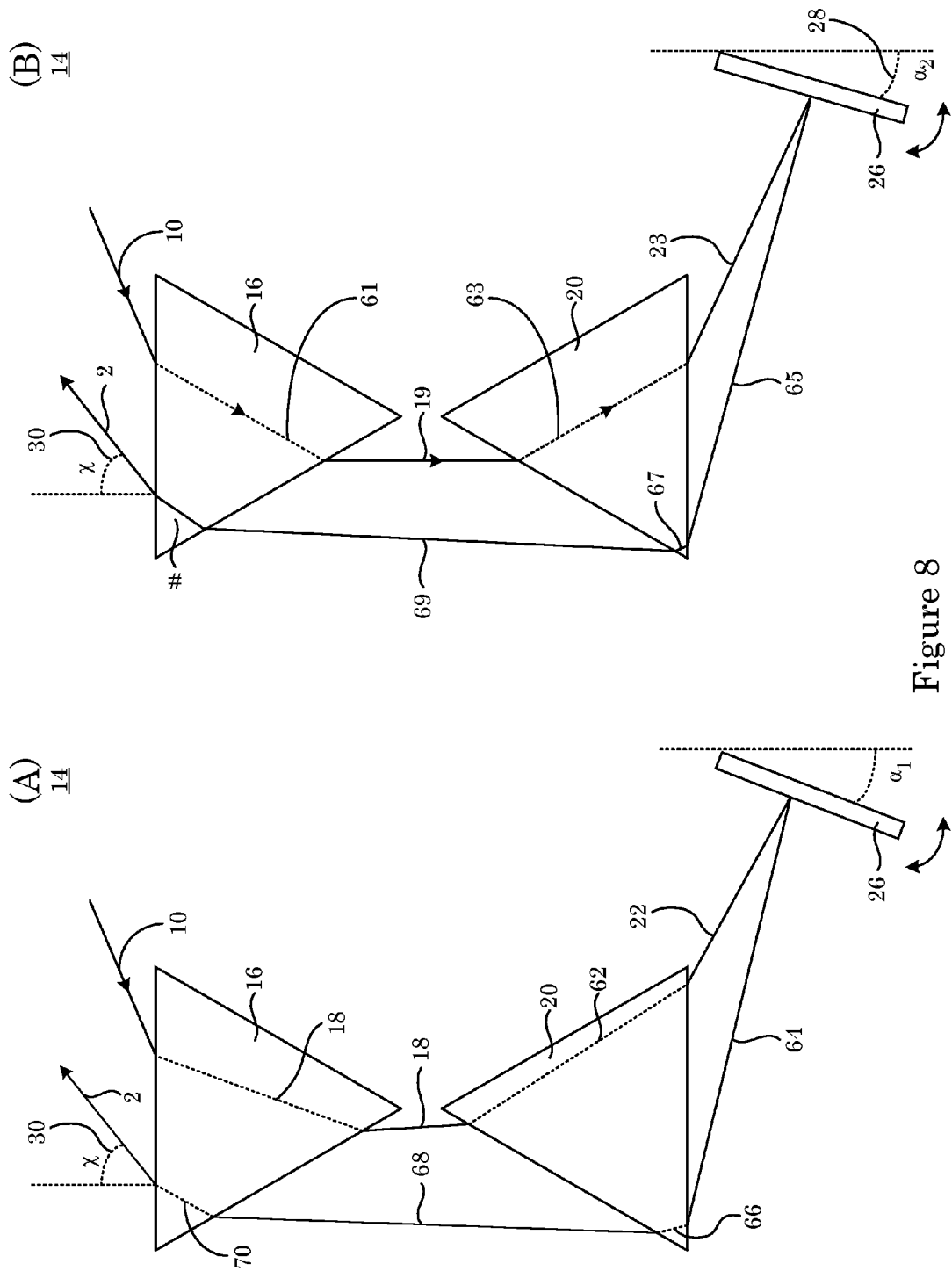
FIG. 8 shows a wavelength selector in which a mirror angle selectively reflects second dispersed light to produce optical parametric light.
Figure 9:
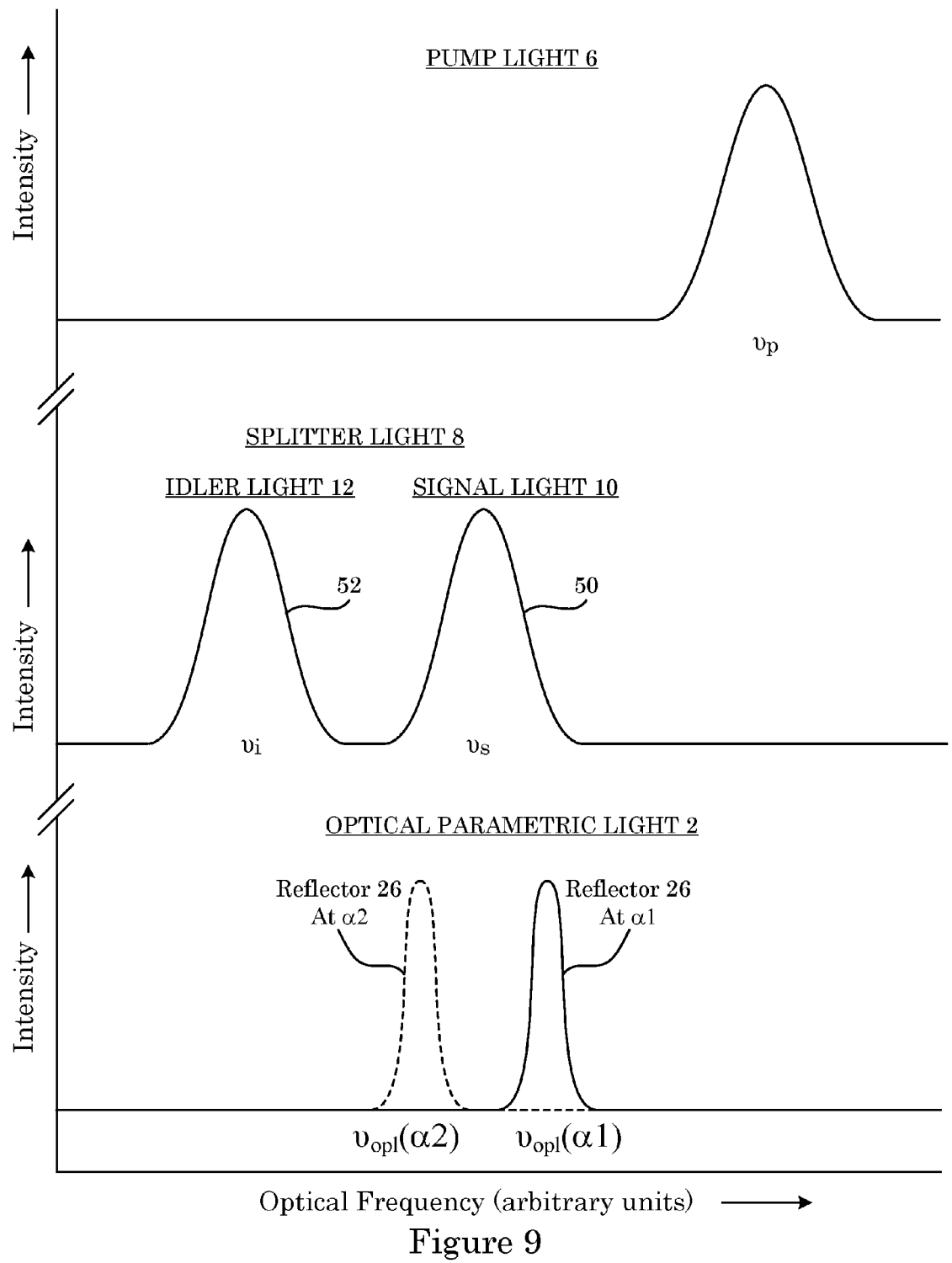
FIG. 9 shows a graph of intensity versus optical frequency.
Figure 10:
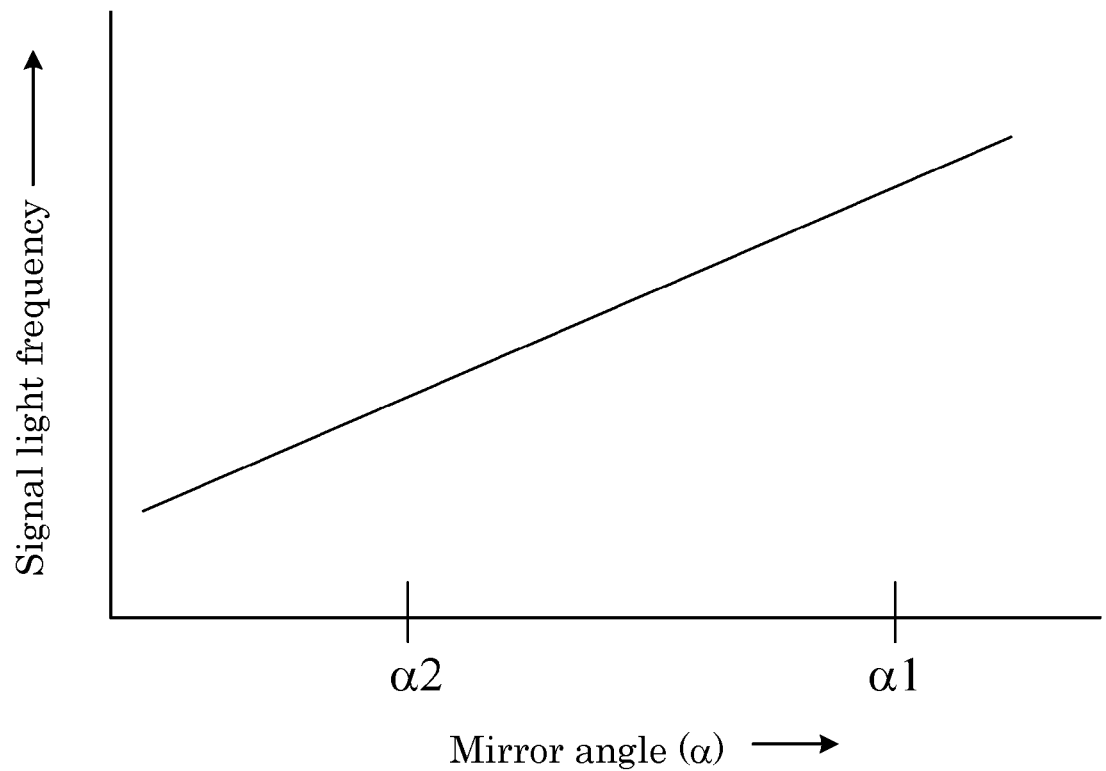
FIG. 10 shows a graph of signal light frequency versus mirror angle.

Light 64 is received at a second surface of second prism 20, and second prism 20 refracts like 64 as refracted light 66 to produce light 68. Light 68 is received at a second surface of first prism 16, and first prism 16 refracts light 68 as refracted light 70 to produce optical parametric light 2 that is at cavity angle 30 (also labelled as $\chi$ in FIG. 7, FIG. 8, and FIG. 11). Although refracted light 70 exits first prism 16 at the first surface, only optical parametric light 2 propagates at cavity angle 30 to be circulated in cavity 32 of optical parametric oscillator 100. Refracted light 70 that exits first prism 16 and propagates at a different angle than at cavity angle 30 is not circulated in cavity 32 of optical parametric oscillator 100 and can be subject to blocking and the like. In this matter, first reflector 26 selects the resonance wavelength of optical parametric light 2 from the plurality of wavelengths of signal light 10 that are refracted and dispersed by first prism 16 and second prism 20 of wavelength selector 14. Moreover, as shown in FIG. 8 (panel A: first mirror angle α1; panel B: second mirror angle α2), first prism 16 and second prism 20 refracts shorter wavelengths of signal light 10 more than longer wavelengths. In an embodiment, mirror angle 28 can be set at first mirror angle α1 that is greater than second mirror angle α2 to select shorter wavelengths of signal light 10 as optical parametric light 2 having first optical frequency $v_{op1}(\alpha 1)$ as shown in FIG. 9. According to an embodiment, mirror angle 28 can be set at second mirror angle α2 that is less than first mirror angle α1 to select longer wavelengths of signal light 10 as optical parametric light 2 having second optical frequency $v_{op1}(\alpha 2)$ as shown in FIG. 9. Here, first optical frequency $v_{op1}(\alpha 1)$ is greater than second optical frequency $v_{op1}(\alpha 2)$. Accordingly, rotation of first reflector 26 with respect to second prism 20 selects a wavelength of optical parametric light 2 from the wavelength of signal light 10. Moreover, first reflector 26 can be continuously rotated (i.e., without skipping an angle) through the plurality of mirror angles 28 to select continuously the wavelength of optical parametric light 2 across a full spectrum of the wavelength of signal light 10. Furthermore, as shown in FIG. 9, optical parametric oscillator 100 receives pump light 6 with frequency $v_p$, produces signal light 10 with signal frequency 50 ($v_s$) and idler light 12 with idler frequency 52 ($v_i$) from pump light 6, and produces optical parametric light 2 with a selected frequency ($v_{op1}$) from signal light 10 based on mirror angle 28 of first reflector 26, as shown in FIG. 10.

Figure 11:
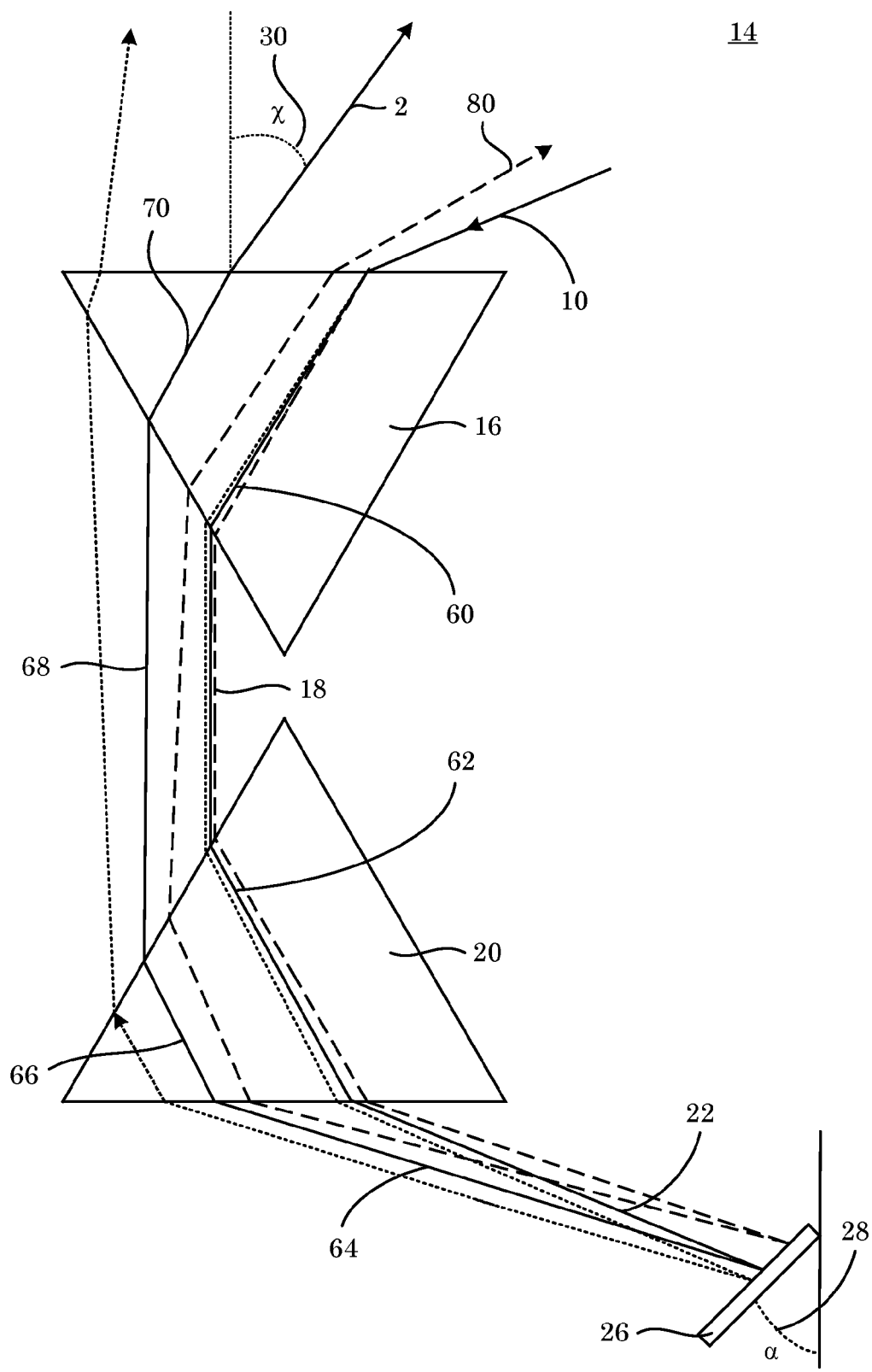
FIG. 11 shows a wavelength selector.

Again, it should be appreciated that, with reference to FIG. 11, shorter wavelengths (dotted curve) of signal light 10 are refracted more than longer wavelengths (dashed curve) by prisms (16, 20) of wavelength selector 14.

Optical parametric oscillator 100 includes optical frequency doubler 36 to provide doubled light 38. Here, optical frequency doubler 36 receives optical parametric light 2 from which doubled light 38 is produced. In some embodiments, optical frequency doubler 36 is disposed in cavity 32, e.g., as shown in FIG. 6, as the intra-cavity doubler. In some embodiments, optical frequency doubler 36 is disposed outside of cavity 32, e.g., as shown in FIG. 5, as the extra cavity doubler. Optical frequency doubler 36 is selected to double frequency of optical parametric light 2 and can include a nonlinear optical crystal such as bismuth borate ($BiB_3O_6$, also referred to as BiBO), potassium dideuterium phosphate ($KD_2PO_4$, KDP), and the like. The selection of a particular material for optical frequency doubler 36 can be based upon a peak wavelength for doubled light 38. Moreover, a size (i.e., dimensions of optical frequency doubler 36) can be any size effective to double the frequency of optical parametric light 2, e.g., dimensions 4 mm×8 mm×10 mm.

Figure 12:
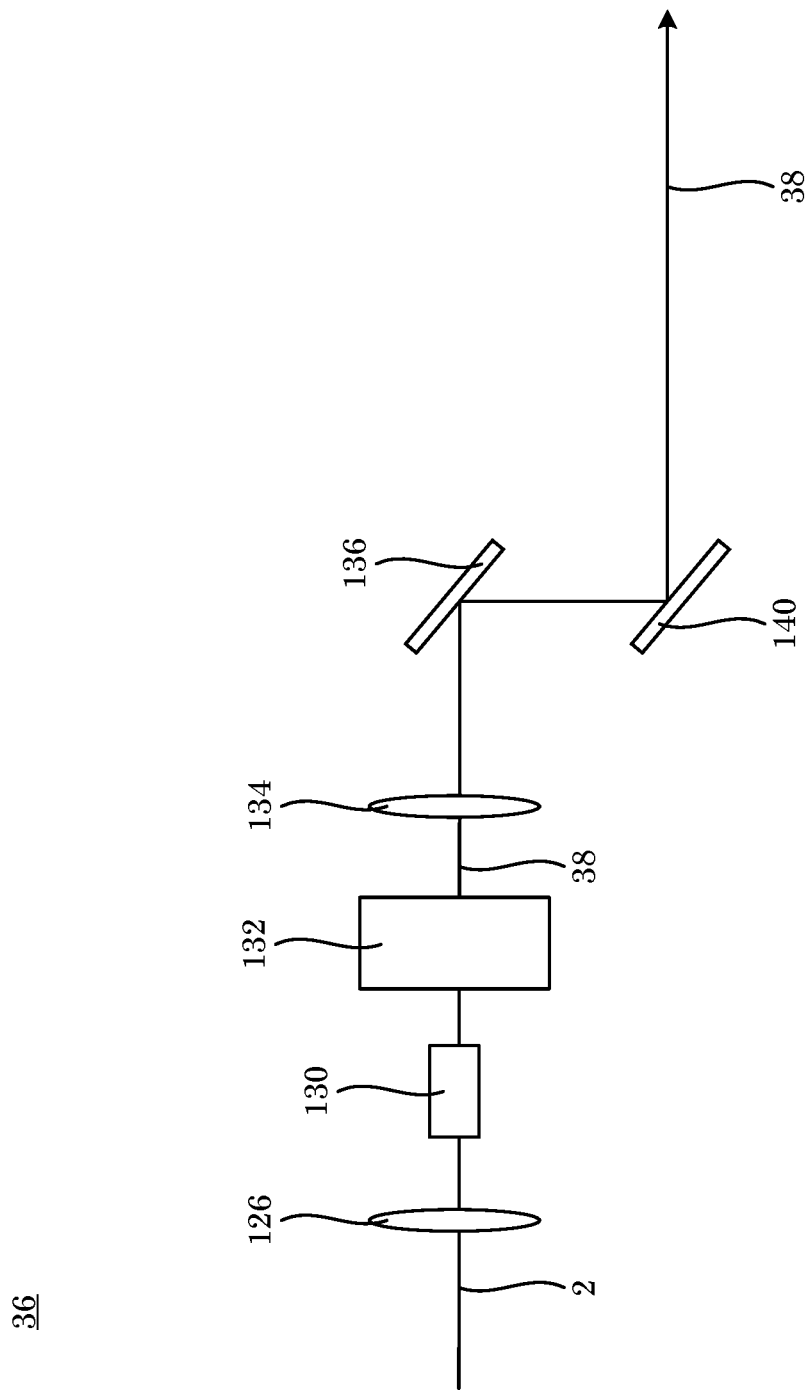
FIG. 12 shows an optical frequency doubler.

According to an embodiment, with regard to optical frequency doubler 36 shown in FIG. 12, optical parametric light 2 is phase-matched in nonlinear optical crystal 130 (e.g., a BiBO crystal) of optical frequency doubler 36. Nonlinear optical crystal 130 phase matches photons from optical parametric light 2 to produce a range of wavelengths of double light 38, e.g., from 340 nm to 570 nm. Signal light 10 or optical parametric light 2 can have horizontal polarization, and doubled light 38 can have vertical polarization, wherein nonlinear optical crystal 130 rotates optical polarization about a vertical axis defined by the polarization axis of optical parametric light 2. In a certain embodiment, the light 38 can have an average power of 1 W produced from optical parametric light 2 with an average power 4 W using come e.g., lens 126 to focus optical parametric light 2 into nonlinear optical crystal 130. Compensating block 132 provides automated tuning of optical frequency doubler 36 in an absence of beam walk. A residual light (e.g., optical parametric light 2) can be removed from doubled light 38 by mirrors 136 (e.g., from a plurality of mirrors such as 136, 140) that reflect light from 340 nm to 575 nm and that transmit light from 680 nm to 1150 nm.

In an embodiment, optical parametric oscillator 100 includes a plurality of cavities 32. Here, with reference to FIG. 13, optical parametric oscillator 100 can include first cavity 304 with extra-cavity doubler 310 (e.g., as shown in FIG. 5) and second cavity 306 with an intra-cavity doubler (e.g., as shown in FIG. 6). Pump light 6 is directed into first cavity 304 or second cavity 306 by optically directing pump light 6 via member 302 (e.g., a mirror, beam splitter, optical switch, and the like) to first cavity 304 or second cavity 306 from pump laser 300. First cavity 304 produces optical parametric light 2 (e.g., from 680 nm to 1150 nm) and idler light 12 (e.g., from 1150 nm to 2300 nm). Optical parametric light 2 from first cavity 304 is received by extra-cavity doubler 310 that provides doubled light 38 (e.g., from 340 nm to 575 nm). Additionally, pump light 6 can be provided to second cavity 306 from pump laser 300, wherein second cavity 306 produces optical parametric light 2 (e.g., from 560 nm to 750 nm). Accordingly, optical parametric oscillator 100 can provide output light having a wavelength from 340 nm to 2300 nm. In some embodiments, pump light 6 from pump laser 300 is split by member 302 to simultaneously pump first cavity 304 and second cavity 306 so that first cavity 304 and second cavity 306 simultaneously provide output light.

For production of optical parametric light 2, the path length of optical parametric oscillator 100 is matched to the temporal coherence path length of optical parametric light 2 in optical parametric oscillator 100. The path length (L) for circulation of optical parametric light 2 in cavity 32 is related to the repetition rate of pump light 6 by c/2L=free spectral range (FSR)=repetition rate of pump light 6, wherein c is the speed of light. Operating optical parametric oscillator 100 at 80 MHz provides a path length of 3.75 m. Mirror 110 is translatable along a propagation direction of path to provide a selected path length. In some embodiments, lens 112 can be translated (e.g., in three-dimensional space), and concave reflectors (102, 104) can be translated along the direction of propagation of pump light 6 to shorten or to lengthen the path length of cavity 32.

In an embodiment, optical parametric oscillator 100 produces optical parametric light 2 and includes: wavelength selector 14 to receive signal light 10 and to produce optical parametric light 2, wavelength selector 14 including: first prism 16 to receive signal light 10 and to produce first dispersed light 18; second prism 20 in optical communication with first prism 16 to receive first dispersed light 18 from first prism 16 and to produce second dispersed light 22, second dispersed light 22 including a plurality of dispersed wavelengths; and first reflector 26 in optical communication with second prism 20: to receive second dispersed light 22 from second prism 20; and to reflect second dispersed light 22 at selected mirror angle 28, mirror angle 28 to control a resonance wavelength of optical parametric oscillator 100, wherein second dispersed light 64 reflected from first reflector 26 is communicated to second prism 20, refracted by second prism 20 based on selected mirror angle 28 and communicated to first prism 16 from second prism 20, received by first prism 16 and refracted by first prism 16 based on selected mirror angle 28 such that first prism 16 produces optical parametric light 2 including the resonance wavelength that is communicated from first prism 16 at cavity angle 30 that couples optical parametric light 2 into cavity 32 of optical parametric oscillator 100, and optical parametric light 2 includes the resonance wavelength that circulates in cavity 32 of optical parametric oscillator 100. The optical parametric oscillator 100 can include frequency splitter 4 in optical communication with wavelength selector 14 and disposed in cavity 32 of optical parametric oscillator 100 to receive pump light 6, to produce splitter light 8 from pump light 6 in response to receipt of pump light 6, and to communicate signal light 10 to wavelength selector 14, wherein splitter light 8 includes: signal light 10 including signal frequency 50; and idler light 12 including idler frequency 52. In an embodiment, optical parametric oscillator 100 further includes: path length compensator 34 in optical communication with wavelength selector 14 and disposed in cavity 32 of optical parametric oscillator 100 to receive optical parametric light 2 from wavelength selector 14 and to adjust a path length of optical parametric oscillator 100 to match a temporal coherence path length of optical parametric light 2 in optical parametric oscillator 100. According to an environment, optical parametric oscillator 100 includes optical frequency doubler 36 in optical communication with wavelength selector 14 to receive optical parametric light 2 and to produce doubled light 36 by doubling a frequency of optical parametric light 2. In a particular embodiment, optical frequency doubler 36 is disposed in cavity 32. In a certain embodiment, optical frequency doubler 36 is disposed external to cavity 32. In an embodiment, optical parametric oscillator 100 produces output light including a wavelength from 340 nm to 2300 nm. According to an embodiment, optical parametric oscillator 100 produces output light including a quasi-continuous wave that is from 50 MHz to less than continuous wave.

In an embodiment, optical parametric oscillator 100 produces optical parametric light 2 and includes: frequency splitter 4 to receive pump light 6 and to produce splitter light 8 from pump light 6, splitter light 8 including: signal light 10 including signal frequency 50; and idler light 12 including idler frequency 52; and the path length selector to adjust a path length of optical parametric oscillator 100 and including wavelength selector 14 that is in optical communication with frequency splitter 4 to receive signal light 10 and to produce optical parametric light 2, wavelength selector 14 including: first prism 16 to receive signal light 10 and to produce first dispersed light 18; second prism 20 in optical communication with first prism 16 to receive first dispersed light 18 from first prism 16 and to produce second dispersed light 22, second dispersed light 22 including a plurality of dispersed wavelengths; and first reflector 26 in optical communication with second prism 20: to receive second dispersed light 22 from second prism 20; and to reflect second dispersed light 64 at selected mirror angle 28, mirror angle 28 to control a resonance wavelength of optical parametric oscillator 100, wherein second dispersed light reflected 64 from first reflector 26 is communicated to second prism 20, refracted by second prism 20 based on selected mirror angle 28 and communicated to first prism 16 from second prism 20, received by first prism 16 and refracted by first prism 16 based on selected mirror angle 28 such that first prism 16 produces optical parametric light 2 including the resonance wavelength that is communicated from first prism 16 at cavity angle 30 that couples optical parametric light 2 into cavity 32 of optical parametric oscillator 100, optical parametric light 2 including the resonance wavelength that circulates in optical parametric oscillator 100, wherein path length compensator 34 adjusts the path length of optical parametric oscillator 100 to match a temporal coherence path length of optical parametric light 2 in optical parametric oscillator 100. In an embodiment, optical parametric oscillator 100 further includes: optical frequency doubler 36 in optical communication with wavelength selector 14: to receive optical parametric light 2 and to produce doubled light 38 by doubling a frequency of optical parametric light 2. In an embodiment, optical frequency doubler 36 is disposed in cavity 32. In an embodiment, optical frequency doubler 36 is disposed external to cavity 32. According to an embodiment, optical parametric oscillator 100 produces output light comprising a wavelength from 340 nm to 2300 nm. According to an embodiment, optical parametric oscillator 100 produces output light comprising a quasi-continuous wave that is 80 MHz.

In an embodiment, optical parametric oscillator 100 produces optical parametric light 2 and includes: frequency splitter 4 to receive pump light 6 and to produce splitter light 8 from pump light 2, splitter light 8 including: signal light 10 including signal frequency 50; and idler light 12 including idler frequency 52; wavelength selector 14 in optical communication with frequency splitter 4 to receive signal light 10 and to produce optical parametric light 2, wavelength selector 14 including: first prism 16 to receive signal light 10 and to produce first dispersed light 18; second prism 20 in optical communication with first prism 16 to receive first dispersed light 18 from first prism 16 and to produce second dispersed light 22, second dispersed light 22 including a plurality of dispersed wavelengths; and first reflector 26 in optical communication with second prism 20: to receive second dispersed light 22 from second prism 20; and to reflect second dispersed light 22 at selected mirror angle 28, mirror angle 28 to control a resonance wavelength of optical parametric oscillator 100, wherein second dispersed light 22 reflected from first reflector 26 is communicated to second prism 20, refracted by second prism 20 based on selected mirror angle 28 and communicated to first prism 16 from second prism 20, received by first prism 16 and refracted by first prism 16 based on selected mirror angle 28 such that first prism 16 produces optical parametric light 2 including the resonance wavelength that is communicated from first prism 16 at cavity angle 30 that couples optical parametric light 2 into cavity 32 of optical parametric oscillator 100, optical parametric light 2 including the resonance wavelength that circulates in optical parametric oscillator 100; and path length compensator 34 in optical communication with wavelength selector 14 to receive optical parametric light 2 from wavelength selector 14 and to adjust a path length of optical parametric oscillator 100 to match a temporal coherence path length of optical parametric light 2 in optical parametric oscillator 100. In an embodiment, optical parametric oscillator 100 further includes: optical frequency doubler 36 in optical communication with wavelength selector 14 to receive optical parametric light 2; and to produce doubled light 38 by doubling a frequency of optical parametric light 2. In some embodiments, optical frequency doubler 36 is disposed in cavity 32 of optical parametric oscillator 100. In some embodiments, optical frequency doubler 36 is disposed external to cavity 32 of optical parametric oscillator 100. It is contemplated that optical parametric oscillator 100 produces output light including a wavelength from 340 nm to 2300 nm. In an embodiment, optical parametric oscillator 100 produces output light including a quasi-continuous wave that is 80 MHz.

In an embodiment, a process for making optical parametric oscillator 100 includes: providing frequency splitter 4 to receive pump light 6 and to produce splitter light 8 from pump light 2, splitter light 8 including: signal light 10 including signal frequency 50; and idler light 12 including idler frequency 52; disposing wavelength selector 14 in optical communication with frequency splitter 4 to receive signal light 10 and to produce optical parametric light 2, wavelength selector 14 including: first prism 16 to receive signal light 10 and to produce first dispersed light 18; second prism 20 in optical communication with first prism 16 to receive first dispersed light 18 from first prism 16 and to produce second dispersed light 22, second dispersed light 22 including a plurality of dispersed wavelengths; and first reflector 26 in optical communication with second prism 20: to receive second dispersed light 22 from second prism 20; and to reflect second dispersed light 22 at selected mirror angle 28, mirror angle 28 to control a resonance wavelength of optical parametric oscillator 100; and forming cavity 32 that includes: frequency splitter 4, wavelength selector 14, and a plurality of mirrors to circulate optical parametric light 2, wherein second dispersed light 22 reflected from first reflector 26 is communicated to second prism 20, refracted by second prism 20 based on selected mirror angle 28 and communicated to first prism 16 from second prism 20, received by first prism 16 and refracted by first prism 16 based on selected mirror angle 28 such that first prism 16 produces optical parametric light 2 including the resonance wavelength that is communicated from first prism 16 at cavity angle 30 that couples optical parametric light 2 into cavity 32 of optical parametric oscillator 100, optical parametric light 2 including the resonance wavelength that circulates in optical parametric oscillator 100. The process also can include disposing a path length compensator 34 in cavity 32 such that path length compensator 34 is in optical communication with wavelength selector 14 to receive optical parametric light 2 from wavelength selector 14 and to adjust a path length of optical parametric oscillator 100 to match a temporal coherence path length of optical parametric light 2 in optical parametric oscillator 100. The process can further include disposing optical frequency doubler 36 in optical communication with wavelength selector 14 to receive optical parametric light 2; and to produce doubled light 38 by doubling a frequency of optical parametric light 2. In some embodiments, optical frequency doubler 36 is disposed in cavity 32 of optical parametric oscillator 100. In some embodiments, optical frequency doubler 36 is disposed external to cavity 32 of optical parametric oscillator 100.

In an embodiment, a process for producing optical parametric light 2 includes: providing optical parametric oscillator 100; receiving, by frequency splitter 4, pump light 6; producing, by frequency splitter 4, splitter light 8 from pump light 2, splitter light 8 including: signal light 10 including signal frequency 50; and idler light 12 including idler frequency 52; receiving, by wavelength selector 14, signal light 10; producing, by wavelength selector 14, optical parametric light 2, wherein first prism 16 receives signal light 10 and produces first dispersed light 18, second prism 20 receives first dispersed light 18 from first prism 16 and produces second dispersed light 22, and first reflector 26: receives second dispersed light 22 from second prism 20, and reflects second dispersed light 22 at selected mirror angle 28, and wherein second dispersed light 22 reflected from first reflector 26 is communicated to second prism 20, refracted by second prism 20 based on selected mirror angle 28 and communicated to first prism 16 from second prism 20, received by first prism 16 and refracted by first prism 16 based on selected mirror angle 28 such that first prism 16 produces optical parametric light 2 including the resonance wavelength; communicating optical parametric light 2 from first prism 16 at cavity angle 30 to couples optical parametric light 2 into cavity 32; circulating optical parametric light 2 in cavity 32; and emitting a portion of optical parametric light 2 from cavity 32 to produce optical parametric light 2. The process also can include adjusting the path length of cavity 32 by path length compensator 34 by matching a temporal coherence path length of optical parametric light 2 in optical parametric oscillator 100. In an embodiment, the process further can include receiving optical parametric light by optical frequency doubler 36; and producing doubled light 38 by doubling a frequency of optical parametric light 2. In some embodiments, the process includes disposing optical frequency doubler 36 in cavity 32 of optical parametric oscillator 100. In some embodiments, the process includes disposing optical frequency doubler 36 external to cavity 32 of optical parametric oscillator 100.

Figure 13:
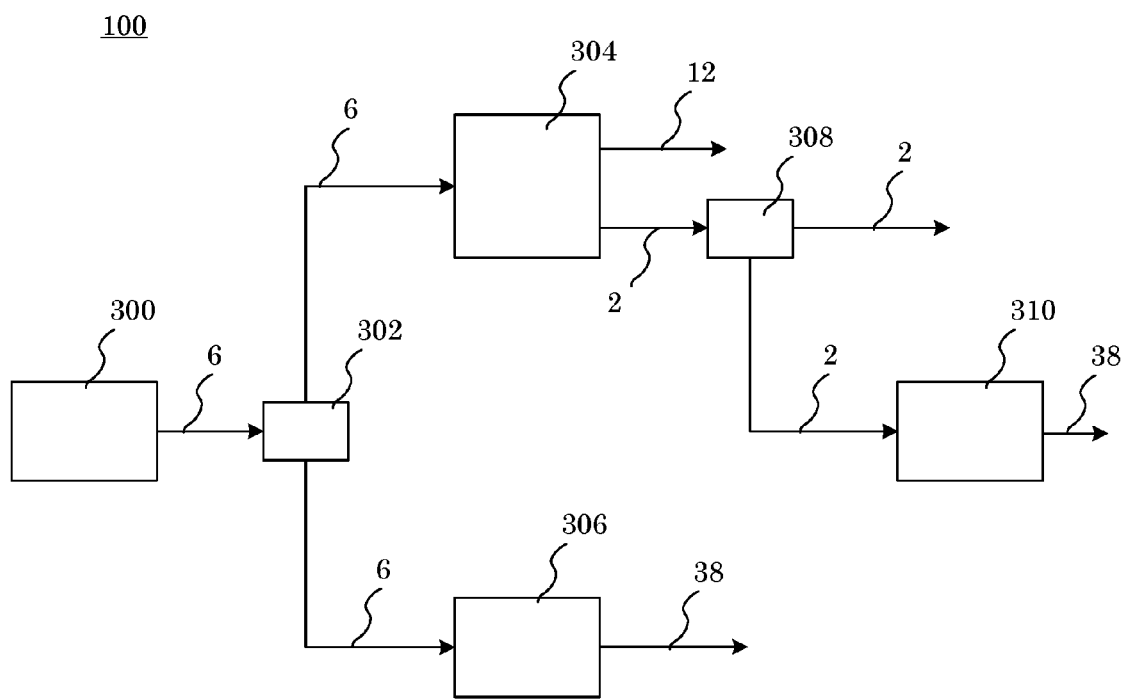
FIG. 13 shows a plurality of optical parametric oscillators.
Figure 14:
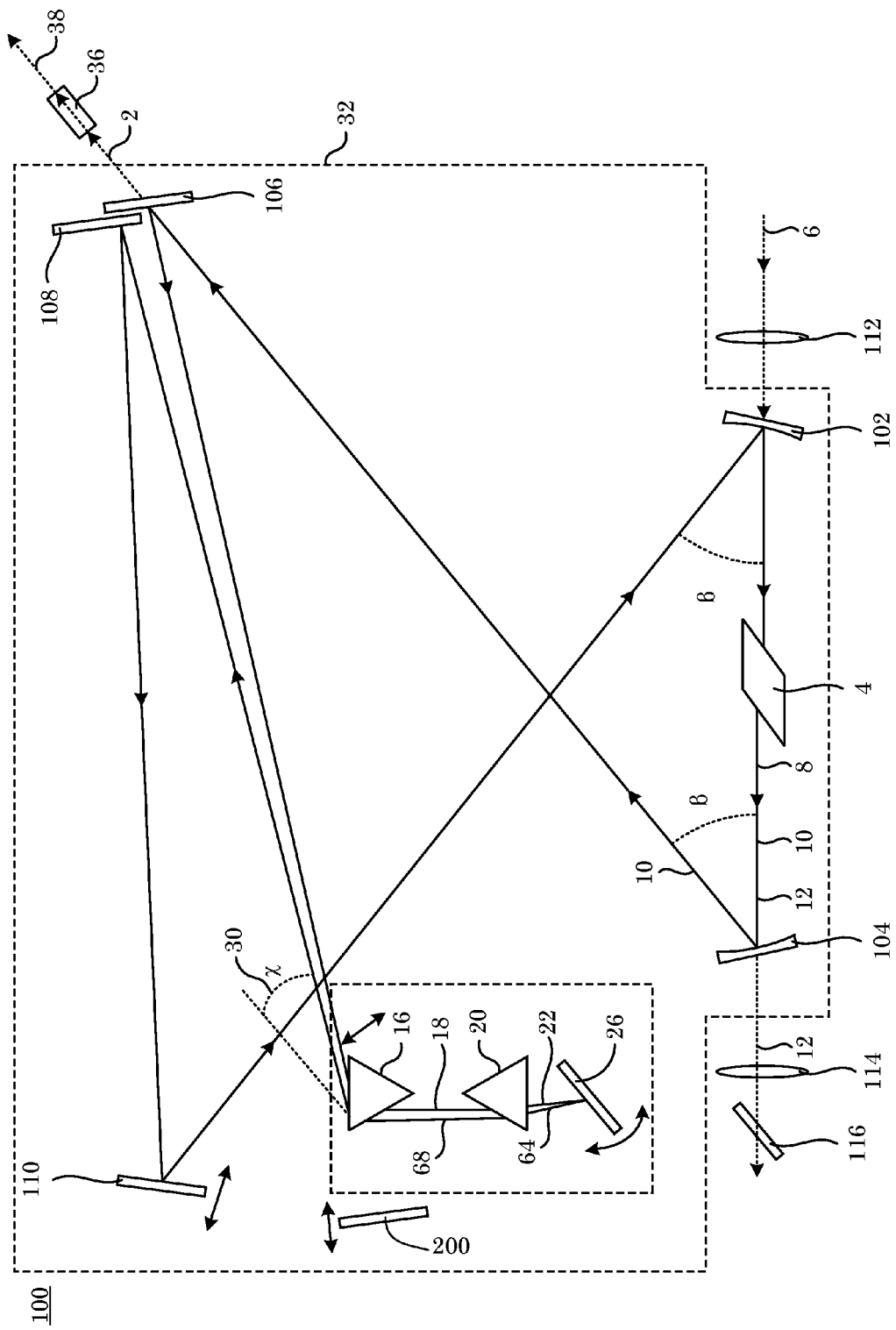
FIG. 14 shows a optical parametric oscillator configured for optical alignment of its cavity.

In an embodiment, with reference to FIG. 13, a process for aligning optical parametric oscillator 100 includes: providing pump light 6; and replacing wavelength selector with alignment mirror 200 (not shown) that can have similar optical and physical properties as mirror 110 or 108 to reflect pump light 6 for optical alignment of cavity 32. If mirrors (104, 108, 110, 200, and 106) reflect pump light 6 well enough so that pump light 6 propagates around cavity 32, cavity 32 can be aligned with pump light 6. Here, concave reflector 102 is transmissive enough for pump light 6 to enter cavity 32. If mirrors (104, 108, 110, 200, and 106) do not reflect pump light 6 well, a second laser beam is injected through mirror 106 from a source external to cavity 32. In a certain embodiment, the second laser beam has a wavelength that is 1064 nm. Advantageously, infrared (IR) light such as the second laser beam is used to align cavity 32 and produces doubled light when cavity 32 is near the proper cavity length and frequency splitter 4 is at a temperature that produces doubled light.

An angle of beams reflected off concave reflectors (104, 102) can be adjusted to achieve minimal aberrations (e.g., astigmatic aberration) from frequency splitter 4. A radius of curvature (R) of a mirror, angle θ, index of refraction (n) of a crystal, and the path length in the crystal, t is related as provided in formula 1.

$$R\sin\theta\tan\theta = \frac{(n^2-1)(n^2+1)^{\frac{1}{2}}t}{n^4} \quad (1)$$

For a 3 cm crystal and 25 cm radius concave mirror, this angle is about 26 degrees. The distance between concave reflectors (104, 102) can be, e.g., about 26.8 cm. A 150 mm focal length (f1) lens can be disposed in the path of pump light 6 prior to concave reflector 102 and used to focus pump light 6 into frequency splitter 4.

To align cavity 32, pump light 6 from mirror 100 to mirror 102 is incident on mirror 102 in a location where pump light 6 transmits through mirror 102 and a reflection off of mirror 102 to mirror 104 follows a same path as pump light 6. A mirror that reflects pump light 6 can be interposed between mirror 104 and mirror 106 to retro-reflect pump light 6 back onto mirror 104, pump light 6 will strike mirror 102 in the proper place, and an angle of mirror 102 is adjusted to direct that beam to where the original beam of pump light 6 struck mirror 110. Thereafter, the retro-reflecting mirror is removed from between mirror 104 and mirror 106, and the pump light 6 from mirror 110 strikes mirror 102 to complete cavity 32.

Once cavity 32 is aligned, mirror 200 can be translated back and forth with respect to a direction of propagation of pump light 6 onto mirror 200 while observing pump light 6 propagating out of cavity 32 from mirror 106, e.g., with either an IR viewer or an IR card. Here, pump light 6 can be maintained proximate to mirrors 106 and 108 so that pump light 6 propagates through prisms (16, 20) at Brewster's angle when wavelength selector 14 is disposed in cavity 32 to replace alignment mirror 200. Residual 532 nm pump light 6 can be blocked by adding a 532 nm mirror between mirror 106 and the IR card. In an embodiment where LBO is used as a frequency splitter, a temperature of frequency splitter 4 can be in a range (e.g., from 110° C. to 150° C.) to circulate light in cavity 32. After circulation is achieved, distances and angles of optical components of cavity 32 can be adjusted. Typical powers are greater than or equal to 2 W for signal light 10 with 8 W of pump light 6 incident initially at frequency splitter 4, depending on an amount of light transmission by mirror 106.

The wavelength of signal light 10 and idler light 12 is in part determined by temperature of frequency splitter 4 relative to a wavelength of pump light 6. A spectrograph can be used to acquire a spectrum of signal light 10, idler light 12, pump light 6, optical parametric light 2, doubled light 38, and the like. The path length of cavity 32 can be adjusted by moving mirror 110 to compensate for changes due to the temperature of frequency splitter 4.

The process for aligning optical parametric oscillator 100 can include replacing alignment mirror 200 with wavelength selector 14, particularly by disposing prisms (16, 20) and first reflector 26 in cavity 32. Brewster prisms (16, 20) (made, e.g., of optical glass such as SF14 or the like) can be mounted (e.g., glued to a substrate that can be disposed on a translation stage) such that the angle between the signal light 10 and the first face of the prism 16 is approximately equal to the angle between dispersed light 18 and the second face of the prism 16 and that the angle between dispersed light 18 and the first face of prism 20 is approximately equal to the angle between dispersed light 22 and the second face of prism 20. In an embodiment, signal light 10 produced by frequency splitter 4 is used to do this. Prisms (16, 20) are disposed in cavity 32 by clipping a portion of the resonated beam while cavity 32 oscillates. Dispersed light 64 reflected from first reflector 26 can be followed back through cavity 32 provide optical alignment that maintains oscillation of light therein. Once oscillation of cavity 32 is achieved, prisms (16, 20) are disposed another few mm into the path of propagation of pump light 6 incoming into wavelength selector 14. After disposing prisms (16, 20) in cavity 32, mirror 110 is translated (e.g., backward or forward with respect to a propagation direction of incident light) until oscillation of cavity 32 is observed again. A distance from a proximate apex of prism 16 to first reflector 26 can be about a same distance as a proximate apex of prism 16 is to alignment mirror 200.

After adjusting optical components of cavity 2, e.g., to maximize power, parameters (e.g., cavity length, angle of prism (16 or 20), and the like) of cavity 32 are adjusted as the temperature of cavity 32 is changed slightly, wherein the angle of first reflector 26 relative to prism 20 and the distance of mirror 110 relative to mirror 108 are independently changed. It is contemplated that the parameters, temperature, angle of first reflector 26, position of mirror 110, and the like are recorded such that tuning of cavity 32 is automated in some embodiments. If reflectivity of mirrors (102, 104, 108, 26, 110, 106) is sufficient to propagate light of a given wavelength in cavity 32 then parameters of cavity 32 can be tuned such that idler light (light with a wavelength greater than twice the pump light wavelength) will oscillate in cavity 32.

In an embodiment, optical parametric oscillator 100 includes optical frequency doubler 36 disposed in cavity 32 as shown in FIG. 6. Here, a process for aligning cavity 32 is similar to that described in preceding paragraphs with regard to FIG. 13. The angle between optical frequency doubler 36, concave reflector 120, and mirror 108 (as well as optical frequency doubler 36, concave reflector 124, and mirror 110) is optimized according to Formula 1. When using two cavities such as first cavity 304 with extra-cavity optical frequency doubler 310 and second cavity 306 with the intra-cavity doubler as shown in FIG. 13, optical parametric light 2, doubled light 38, or idler light 12 from first cavity 304 can be used as a light beam for initial alignment of second cavity 306. Here, alignment can include directing approximately 1060 nm-1070 nm light from first cavity 304 into second cavity 306 through mirror 110 (e.g., approximately 1%-5% transmitting) to concave reflector 102 or concave reflector 124 of second cavity 306 and following this beam throughout second cavity 306 with prisms (16, 20) disposed in second cavity 306. First reflector 26 of second cavity 306 is adjusted to select the wavelength of the introduced beam to traverse second cavity 306. As the temperature of intra-cavity optical frequency doubler 36 and second cavity 306 is changed, non-critical phase matching of the 1060 nm alignment beam occurs in optical frequency doubler 36, and green light exits concave reflector 102 or concave reflector 104 of second cavity 306, depending on which concave reflector (102 or 104) initially received the beam. In an embodiment, concave reflector 102 of second cavity 306 initially receives the beam such that green light exits concave reflector 104 of second cavity 306. In some embodiments, concave reflector 104 the second cavity 306 initially receives the beam, and green light exits concave reflector 102 of second cavity 306. Matching the path length of second cavity 306 to that of first cavity 304 is accomplished by changing the position of a mirror along the direction of the light beam in second cavity 306 (e.g., first reflector 26 or mirror 108) with the beam substantially normal to a surface of the selected optical element (first reflector 26 or mirror 108) such that green light output of optical frequency doubler 36 in second cavity 306 is increased relative to an initial, non-resonant amount of light out of optical frequency double 36. To align pump light 6 into second cavity 306, a plurality of irises (e.g., two irises) are disposed along the path of the green light where it exits second cavity 306. Pump light 6 is communicated through the irises so that pump light 6 overlaps the path of light in second cavity 306.

In an embodiment, member 302 includes a half-wave plate and 45-degree polarizer selected for 532 nm and is interposed between pump laser 300 and cavities (304, 306). Member 302 selects whether first cavity 304 or second cavity 306 is driven by pump light 6 by rotating the half-wave plate. A second half-wave plate can be disposed in the path of pump light 6 to change a linear polarization of pump light 6, e.g., from horizontally polarized to vertically polarized.

Optical parametric oscillator 100 has numerous beneficially and advantageous properties. Beneficially, optical parametric oscillator 100 provides output light having a broadly tunable wavelength range, including optical parametric light from 680 nm to 1150 nm and idler light 12 from 1150 nm to 2300 nm. Optical parametric light 2 can be communicated through optical frequency doubler 36 to provide doubled light from 340 nm to 575 nm.

Over this range, optical parametric oscillator 100 unexpectedly provides the output light with high-power (e.g., 1

W to 5 W) and narrow line-width (e.g., less than or equal to 1 nm) in a quasi-continuous wave (e.g., 80 MHz) that can be tuned from 340 nm to 2300 nm. In an embodiment, operation of optical parametric oscillator 100 is fully automated, and optical parametric oscillator 100 is solid state and fits on a transportable table top. Moreover, optical parametric oscillator 100 can include frequency splitter 4 that includes a lithium triborate (LBO) crystal pumped by a high power (20 W), 532 nm laser as pump laser 300. By adjusting the temperature of frequency splitter 4, the length of cavity 32, and the angle of prisms (16, 20) in cavity 32, a wide range of wavelengths of output light from optical parametric oscillator 100 is obtained. The wavelength range of optical parametric light 2 is extended by doubling its optical frequency using optical frequency doubler 36, which can include a bismuth borate (BiBO) frequency doubling crystal.

Figure 15:
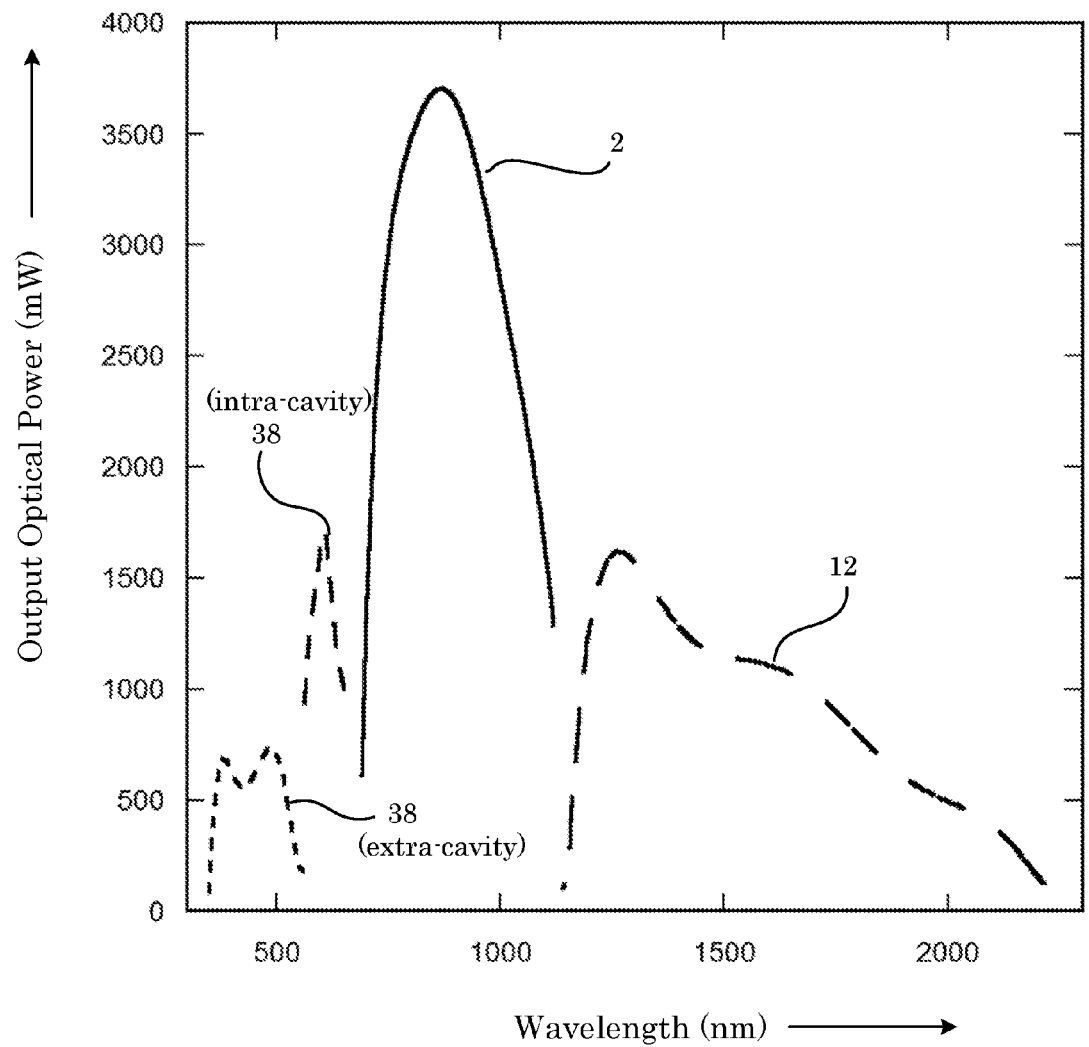
FIG. 15 shows a graph of output optical power versus wavelength.

Advantageously, optical parametric oscillator 100 output light is a coherent and quasi-continuous wave with a repetition rate provided by a repetition rate of pump laser 300 (e.g., about 80 MHz). An optical power of the output light is from hundreds of milliwatts (mW) (e.g., 200 mW) to 4 W, depending on the wavelength of the output light as shown in FIG. 15 for a graph of power of idler light 12, optical parametric light 2, doubled light 38 from extra-cavity optical frequency doubler 38, and intra-cavity doubled light 38 versus wavelength of output light from optical parametric oscillator 100.

Figure 16:
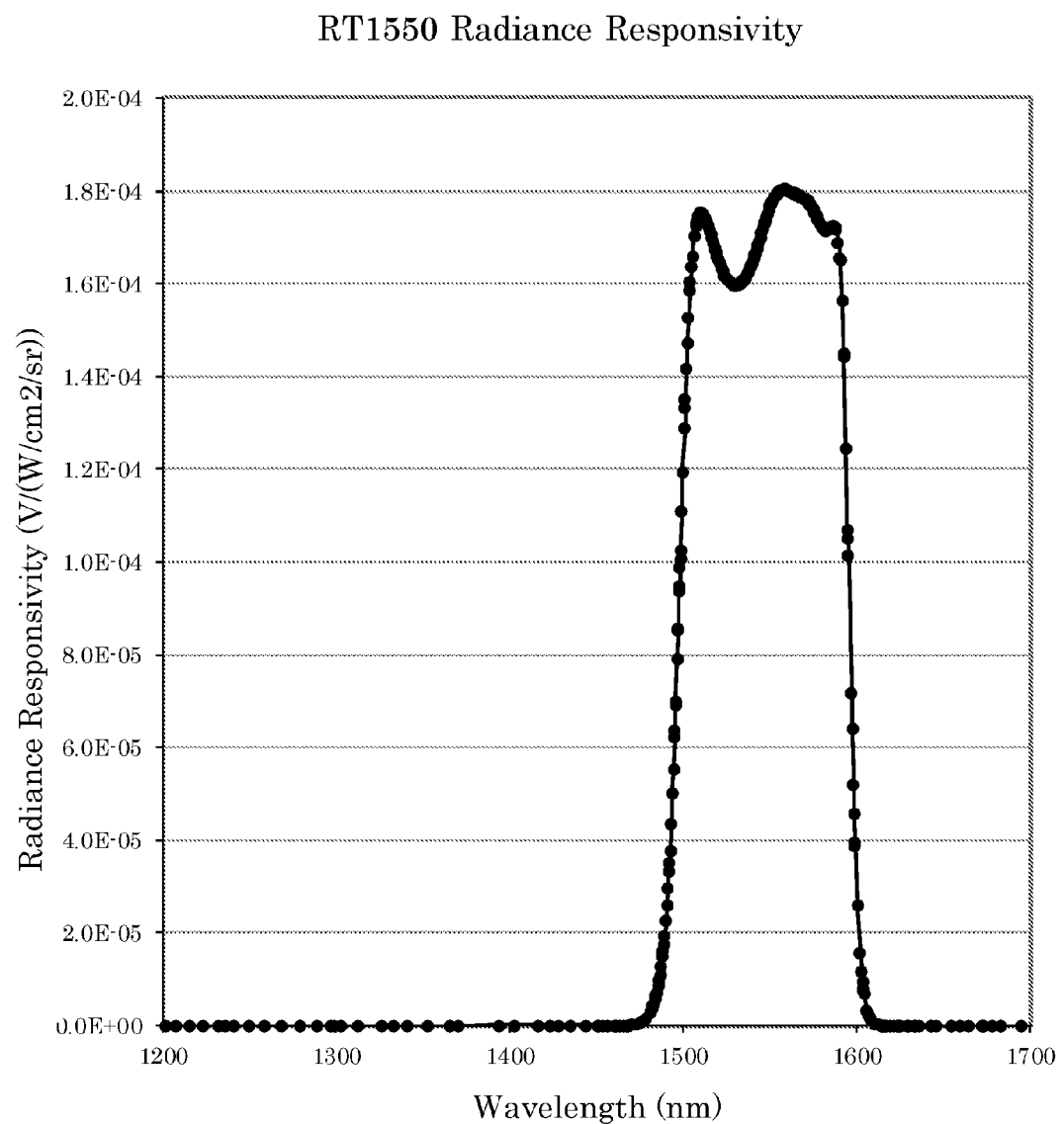
FIG. 16 shows a graph of radiance responsivity versus wavelength.
Figure 17:
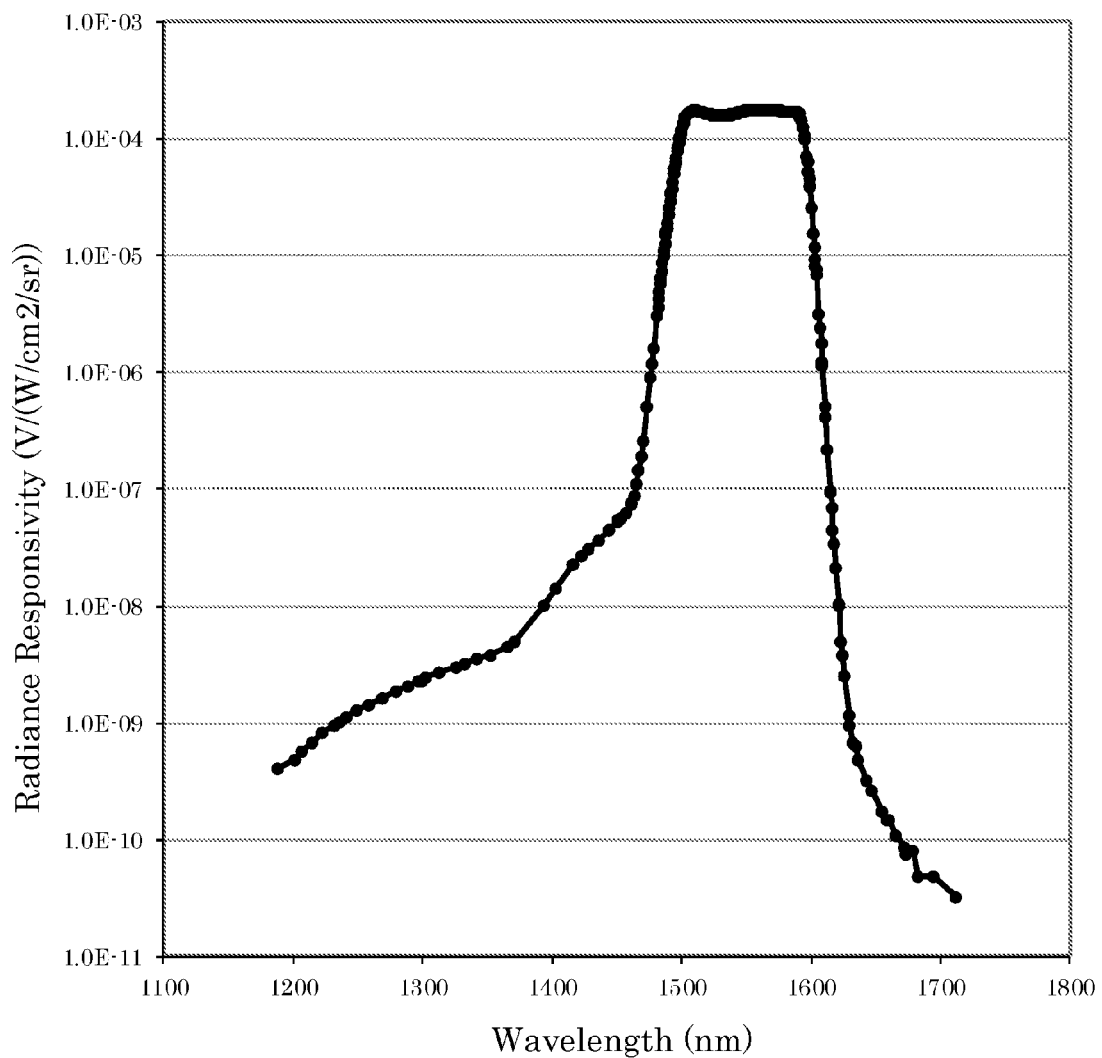
FIG. 17 shows a graph of radiance responsivity versus wavelength.

According to an embodiment, optical parametric oscillator 100 is used as a source of broadly tunable laser light to calibrate a spectral responsivity of a large aperture optical instrument, e.g., earth-observing satellite sensors. It is contemplated that optical parametric oscillator 100 replaces a suite of lasers that are used to span the spectral range with a single, fully automated system. Here, optical parametric oscillator 100 can be controlled by a processor (e.g., a computer) to adjust the temperature of frequency splitter 4 or optical frequency doubler 36 and to move prisms (16, 20) and mirror 110 to provide a selected wavelength of output light from optical parametric oscillator 100. It is contemplated that the wavelength of the output light can be determined with an interferometer. In a certain embodiment, the output light is communicated to an integrating sphere, wherein the output light from optical parametric oscillator 100 can be communicated to the integrating sphere via an optical fiber. An optical output of the integrating sphere is measured with a reference standard having a known optical response, and a device under test is subjected to the output light from optical parametric oscillator 100. The device measures the output light to provide a transfer from the reference standard to the device under test. In an embodiment, optical radiance responsivity of a filter radiometer is subject to calibration. The radiance responsivity of the filter radiometer is shown in FIG. 16 as a graph of radiance responsivity versus wavelength for a filter radiometer on a linear scale. Each point represents the radiance responsivity at a different wavelength selected from our embodiment of the optical parametric oscillator. FIG. 17 shows a graph of radiance responsivity versus wavelength for the filter radiometer on a logarithmic scale. The measured responsivities span more than 6 orders of magnitude demonstrating the advantage of high laser power in a wavelength tunable light source.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An optical parametric oscillator to produce optical parametric light, the optical parametric oscillator comprising:
 a frequency splitter to receive a pump light and to produce a splitter light from the pump light, the splitter light comprising:
  a signal light comprising a signal frequency; and
  an idler light comprising an idler frequency; and
 a path length selector to adjust a path length of the optical parametric oscillator and comprising a wavelength selector that is in optical communication with the frequency splitter to receive the signal light and to produce the optical parametric light, the wavelength selector comprising:
  a first prism to receive the signal light and to produce first dispersed light;
  a second prism in optical communication with the first prism to receive the first dispersed light from the first prism and to produce second dispersed light, the second dispersed light comprising a plurality of dispersed wavelengths; and
  a first reflector in optical communication with the second prism:
    to receive the second dispersed light from the second prism; and
    to reflect the second dispersed light at a selected mirror angle, the mirror angle to control a resonance wavelength of the optical parametric oscillator,
  wherein the second dispersed light reflected from the first reflector is communicated to the second prism, refracted by the second prism based on the selected mirror angle and communicated to the first prism from the second prism, received by the first prism and refracted by the first prism based on the selected mirror angle such that the first prism produces the optical parametric light comprising the resonance wavelength that is communicated from the first prism at a cavity angle that couples the optical parametric light into a cavity of the optical parametric oscillator,
    the optical parametric light comprising the resonance wavelength that circulates in the optical parametric oscillator,
wherein the path length selector adjusts the path length of the optical parametric oscillator to match a temporal coherence path length of the optical parametric light in the optical parametric oscillator.

2. The optical parametric oscillator of claim 1, further comprising:
  an optical frequency doubler in optical communication with the with the wavelength selector to:
    receive the optical parametric light; and
    produce doubled light by doubling a frequency of the optical parametric light.

3. The optical parametric oscillator of claim 2, wherein the optical frequency doubler is disposed in the cavity of the optical parametric oscillator.

4. The optical parametric oscillator of claim 2, wherein the optical frequency doubler is disposed external to the cavity of the optical parametric oscillator.

5. The optical parametric oscillator of claim 1, wherein the optical parametric oscillator produces output light comprising a wavelength from 340 nm to 2300 nm.

6. The optical parametric oscillator of claim 1, wherein the optical parametric oscillator produces output light comprising a quasi-continuous wave that is from 20 MHz to less than a continuous wave.

7. An optical parametric oscillator to produce optical parametric light, the optical parametric oscillator comprising:
  a frequency splitter to receive a pump light and to produce a splitter light from the pump light, the splitter light comprising:
    a signal light comprising a signal frequency; and
    an idler light comprising an idler frequency;
  a wavelength selector in optical communication with the frequency splitter to receive the signal light and to produce the optical parametric light, the wavelength selector comprising:
    a first prism to receive the signal light and to produce first dispersed light;
    a second prism in optical communication with the first prism to receive the first dispersed light from the first prism and to produce second dispersed light, the second dispersed light comprising a plurality of dispersed wavelengths; and
    a first reflector in optical communication with the second prism:
      to receive the second dispersed light from the second prism; and
      to reflect the second dispersed light at a selected mirror angle, the mirror angle to control a resonance wavelength of the optical parametric oscillator,
    wherein the second dispersed light reflected from the first reflector is communicated to the second prism, refracted by the second prism based on the selected mirror angle and communicated to the first prism from the second prism, received by the first prism and refracted by the first prism based on the selected mirror angle such that the first prism produces the optical parametric light comprising the resonance wavelength that is communicated from the first prism at a cavity angle that couples the optical parametric light into a cavity of the optical parametric oscillator,
      the optical parametric light comprising the resonance wavelength that circulates in the optical parametric oscillator; and
  a path length compensator in optical communication with the wavelength selector to receive the optical parametric light from the wavelength selector and to adjust a path length of the optical parametric oscillator to match a temporal coherence path length of the optical parametric light in the optical parametric oscillator.

8. The optical parametric oscillator of claim 7, further comprising:
  an optical frequency doubler in optical communication with the with the wavelength selector to:
    receive the optical parametric light; and
    produce doubled light by doubling a frequency of the optical parametric light.

9. The optical parametric oscillator of claim 8, wherein the optical frequency doubler is disposed in the cavity of the optical parametric oscillator.

10. The optical parametric oscillator of claim 8, wherein the optical frequency doubler is disposed external to the cavity of the optical parametric oscillator.

11. The optical parametric oscillator of claim 7, wherein the optical parametric oscillator produces output light comprising a wavelength from 340 nm to 2300 nm.

12. The optical parametric oscillator of claim 7, wherein the optical parametric oscillator produces output light comprising a quasi-continuous wave that is from 20 MHz to less than a continuous wave.

* * * * *